United States Patent
Park et al.

(10) Patent No.: US 12,364,354 B2
(45) Date of Patent: Jul. 22, 2025

(54) ELECTRIC PRESSURE COOKER DISCHARGING INTERNAL STEAM WHEN LID IS OPENED

(71) Applicant: LG Electronics Inc., Seoul (KR)

(72) Inventors: Byungkyu Park, Seoul (KR); Hyeunsik Nam, Seoul (KR); Wan Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1090 days.

(21) Appl. No.: 16/796,580

(22) Filed: Feb. 20, 2020

(65) Prior Publication Data
US 2021/0007532 A1   Jan. 14, 2021

(30) Foreign Application Priority Data

Jul. 10, 2019 (KR) .......................... 10-2019-0083491

(51) Int. Cl.
*A47J 27/092* (2006.01)
*A47J 27/00* (2006.01)
(Continued)

(52) U.S. Cl.
CPC ........... *A47J 27/092* (2013.01); *A47J 27/004* (2013.01); *A47J 27/0813* (2013.01); *F24C 7/082* (2013.01)

(58) Field of Classification Search
CPC .. A47J 27/62; A47J 27/09; A47J 36/32; A47J 27/0802; A47J 27/04; A47J 36/321;
(Continued)

(56) References Cited

U.S. PATENT DOCUMENTS

| 2,633,870 A * | 4/1953 | Lind ....................... A47J 27/09 220/203.19 |
| 2003/0116578 A1* | 6/2003 | Wooderson ............. A47J 27/09 220/756 |

(Continued)

FOREIGN PATENT DOCUMENTS

| JP | 2003235728 | 8/2003 |
| JP | 2010104731 | 5/2010 |

(Continued)

OTHER PUBLICATIONS

Extended European Search Report in European Appln. No. 20151702.6, dated Jul. 29, 2020, 7 pages.

(Continued)

*Primary Examiner* — Sang Y Paik
*Assistant Examiner* — Bonita Khlok
(74) *Attorney, Agent, or Firm* — Fish & Richardson P.C.

(57) ABSTRACT

An electric pressure cooker includes: a main body, an internal pot, a lid coupling ring configured to rotate relative to the main body, an internal lid that is disposed in the lid coupling ring and that defines a steam inlet, a steam discharge module configured to rotate relative to the internal lid and discharge steam; a lid handle that is configured to rotate the lid coupling ring relative to the main body and that includes a button configured to receive external force; and an external force delivery part configured to receive the external force from the button and transmit the external force to rotate the steam discharge module. The button is configured to: in a first manipulation state, allow rotation of the lid handle; and in a second manipulation state, apply the external force to the external force delivery part to thereby rotate the steam discharge module.

20 Claims, 17 Drawing Sheets

(51) Int. Cl.
    *A47J 27/08* (2006.01)
    *F24C 7/08* (2006.01)
(58) Field of Classification Search
    CPC ...... A47J 27/00; A47J 27/0813; A47J 27/004;
        A47J 2027/043; A47J 27/0804; A47J
        27/0806; A47J 27/0811; A47J 27/092;
        A47J 27/086; A47J 36/06; A47J 36/062;
        A47J 36/064; A47J 36/10; F24C 7/082;
        F16K 31/06; H01F 7/16
    USPC .......... 219/209, 431, 440, 441, 438; 99/324,
        99/325, 330, 331, 332, 333, 337, 339,
        99/341, 342, 403, 468, 470
    See application file for complete search history.

(56) References Cited

U.S. PATENT DOCUMENTS

| | | | |
|---|---|---|---|
| 2013/0199633 A1* | 8/2013 | Hasegawa | F16K 15/063 137/511 |
| 2016/0198883 A1 | 7/2016 | Wang et al. | |
| 2016/0345766 A1* | 12/2016 | Sapire | A47J 27/0815 |
| 2018/0310747 A1 | 11/2018 | Wang et al. | |
| 2019/0075956 A1* | 3/2019 | Bang | A47J 27/0802 |
| 2019/0167028 A1* | 6/2019 | Wang | A47J 27/09 |
| 2020/0128996 A1* | 4/2020 | Qin | A47J 27/09 |
| 2021/0068578 A1* | 3/2021 | Peng | A47J 27/092 |
| 2022/0151424 A1* | 5/2022 | Luo | A47J 36/38 |

FOREIGN PATENT DOCUMENTS

| | | |
|---|---|---|
| KR | 10-0160848 | 11/1998 |
| KR | 19980059836 | 11/1998 |
| KR | 20120013766 | 2/2012 |
| KR | 20180003398 | 1/2018 |
| KR | 101855518 | 5/2018 |
| WO | WO2015051446 | 4/2015 |

OTHER PUBLICATIONS

PCT International Search Report in International Appln. No. PCT/KR2020/001571, dated May 21, 2020, 7 pages (with English translation).

* cited by examiner

RELATED ART

RELATED ART

ELECTRIC PRESSURE COOKER DISCHARGING INTERNAL STEAM WHEN LID IS OPENED

CROSS-REFERENCE TO RELATED APPLICATION

This application claims priority to and the benefit of Korean Patent Application No. 10-2019-0083491, filed on Jul. 10, 2019, the disclosure of which is incorporated herein by reference in its entirety.

TECHNICAL FIELD

The present disclosure relates to an electric pressure cooker that may decrease remaining internal pressures by automatically discharging internal steam when a lid is opened.

BACKGROUND

An electric pressure cooker may cook various sorts of food such as rice. For example, the electric pressure cooker may cook food items using high-pressure steam generated in the electric pressure cooker.

In some examples, the electric pressure cooker may seal its inside through a main body and a lid to generate high-pressure steam in the electric pressure cooker. In some cases, when the lid is separated from the main body in a state in which internal steam still remains in the electric pressure cooker, the lid may abnormally escape from the main body, thereby causing damage to the electric pressure cooker and, in the worst case scenario, causing an explosion and a fire.

In some examples, steam in the electric pressure cooker may be discharged when the lid of the cooker is opened.

For instance, FIGS. 1A and 1B are views illustrating operations of a steam discharge device applied to an electric pressure cooker in related art.

Referring to FIGS. 1A and 1B, a steam discharge opening 2 is fixed to an external cover (a lid) 1. A pressure weight 3 may, when pressure of steam discharged out of the steam discharge opening 2 is greater than certain pressure, tilt and discharge pressure in the cooker.

A rotating disc 4 may include an inclined portion 5, a lever 7 may include a roller 6 rotating based on a swivel of the inclined portion 5, and a spring 8 may elastically push the lever 7 on the rotating disc 4.

When a user rotates the rotating disc 4 to separate the external cover 1 from a main body, an inclined surface formed at the rotating disc 4 contacts the roller 6, the roller 6 is pushed upwards at the same time as the roller 6 is rotated by the inclined surface, and the lever 7 ascends.

When the lever 7 ascends, a front end of the lever 7 pushes the pressure weight 3 blocking the steam discharge opening 2, and, accordingly, the steam discharge opening 2 is opened and steam is discharged.

In some examples, the steam discharging method may be limitedly applied to an electric pressure cooker that discharges steam using a pressure weight. For instance, the method may not be applied to an electric pressure cooker that maintains internal vapor pressure using a spring without a pressure weight.

SUMMARY

The present disclosure describes an electric pressure cooker that may discharge internal steam automatically when a lid is opened and may remove remaining pressures in the cooker.

Additionally, the present disclosure describes an electric pressure cooker that may perform operations of discharging steam and decoupling a main body and a lid at a time according to a user's single manipulation.

Further, the present disclosure describes an electric pressure cooker that does not allow to open a lid before the remaining pressures in the cooker are removed.

Objectives of the present disclosure are not limited to what has been described. Additionally, other objectives and advantages that have not been mentioned may be clearly understood from the following description and may be more clearly understood from implementations. Further, it will be understood that the objectives and advantages of the present disclosure may be realized via means and a combination thereof that are described in the appended claims.

According to one aspect of the subject matter described in this application, an electric pressure cooker includes: a main body that defines a body opening at an upper surface; an internal pot configured to be accommodated in the main body through the body opening; a lid coupling ring configured to rotate relative to the main body and be coupled to the upper surface of the main body; an internal lid disposed in the lid coupling ring and configured to cover an upper surface of the internal pot, where the internal lid defines a steam inlet; a steam discharge module configured to horizontally rotate relative to the internal lid and discharge steam received through the steam inlet from an inside of the internal pot; a lid handle configured to horizontally rotate the lid coupling ring relative to the main body, where the lid handle includes a button disposed at one side of the lid handle and configured to receive external force; and an external force delivery part configured to receive the external force from the button and transmit the external force to rotate the steam discharge module. The button is configured to: in a first manipulation state, allow rotation of the lid handle; and in a second manipulation state, apply the external force to the external force delivery part to thereby rotate the steam discharge module.

Implementations according to this aspect may include one or more of the following features. For example, the external force delivery part may be connected to the button and include at least one of a lever, a link, a rod, or a wire. In some examples, the button may be configured to: in the first manipulation state, be positioned at a first position relative to the one side of the lid handle, the first position corresponding to a complete operation of the button; and in the second manipulation state, be positioned at a second position relative to the one side of the lid handle, the second position corresponding to an incomplete operation of the button.

In some implementations, the electric pressure cooker may further include an internal pot packing configured to be installed along a perimeter of the internal lid and configured to cover a space defined between the internal lid and the internal pot. In some implementations, the main body may include a main body coupling ring disposed at the upper surface of the main body, and the lid coupling ring may be configured to rotate relative to the main body coupling ring to thereby couple to the main body coupling ring.

In some examples, the main body coupling ring may include a plurality of guide jaws, and the lid coupling ring may include a plurality of stopping jaws that are configured to move circumferentially with respect to the plurality of guide jaws and engage with the plurality of guide jaws, respectively.

In some implementations, the steam discharge module may be configured to block the steam inlet based on a rotation angle of the steam discharge module according to a pressure in the internal pot. In some implementations, the steam discharge module may be configured to be horizontally rotated by rotational force supplied through the external force delivery part to thereby discharge the steam outwards.

In some implementations, the steam discharge module may include: a housing that is configured to horizontally rotate relative to the internal lid and that defines a screw groove on an inner surface; a spring guide that is disposed in the housing and that is configured to, based on rotation of the housing, move up or move down in the housing, where the spring guide includes a screw thread coupled to the screw groove; a spring that is disposed in the housing and that has one end fixed to the spring guide; and a pressure pipe configured to block the steam inlet based on elasticity of the spring.

In some examples, the pressure pipe may be configured to: based on the spring guide moving up in the housing, move away from the steam inlet to thereby open the steam inlet; and based on the spring guide moving down in the housing, move to the steam inlet to thereby block the steam inlet. In some examples, the spring may surround the pressure pipe. In some implementations, the lid handle may be configured to horizontally rotate and provide rotational force to the lid coupling ring based on a pressure in the internal pot becoming less than a predetermined pressure as the steam discharge module discharges steam.

In some implementations, the electric pressure cooker may further include a manipulation limitation member configured to maintain the button in the second manipulation state based on a pressure in the internal pot being less than a predetermined pressure.

In some implementations, the external force delivery part may include a connection member that is connected to the button and that is configured to move in a linear direction based on the external force delivered through the button, and the steam discharge module may include a spiral-shaped rotation guide member that is disposed on an outer surface of the steam discharge module and that is configured to convert linear force delivered by the connection member into rotational force.

In some examples, the button may be configured to move from a reference position to the first manipulation state to thereby move the connection member in the linear direction by a movement distance greater than a reference distance. The internal lid may include a manipulation limitation member that is configured to limit the movement distance of the connection member to be less than the reference distance based on a pressure in the internal pot being greater than or equal to a predetermined pressure.

In some implementations, the manipulation limitation member may pass through the internal lid and include a pressure weight that is configured to move in an upper direction from the internal lid to thereby limit movement of the connection member in the linear direction based on the pressure in the internal pot being greater than or equal to the predetermined pressure.

In some implementations, the external force delivery part may include: a connection member that is connected to the button and that is configured to move in a linear direction based on the external force delivered through the button; a link bar having a first end connected to the connection member and a second end connected to an outer surface of the steam discharge module, the link bar being configured to convert linear force delivered by the connection member into rotational force; and a direction guide jaw that protrudes from an upper surface of the internal lid and that is configured to limit rotation of the steam discharge module based on the steam discharge module being rotated by the rotational force delivered through the link bar.

In some implementations, the external force delivery part may include: a connection member that is connected to the button and that is configured to move in a linear direction by the external force delivered through the button; a lever that has a supporting point fixed to the internal lid, the lever having (i) a first end configured to rotate in a first direction with respect to the supporting point by linear force delivered by the connection member and (ii) a second end configured to rotate in a second direction opposite to the first direction; and a wire that has a first end connected to the second end of the lever and a second end connected to an outer surface of the steam discharge module.

In some implementations, the electric pressure cooker may further include: a noise reduction module that is disposed on an upper surface of the internal lid, that has a ring shape, and that surrounds the steam discharge module, where an inner circumferential surface of the noise reduction module may be spaced apart from the steam discharge module. In some examples, the steam discharge module may be configured to discharge the steam horizontally toward the inner circumferential surface of the noise reduction module.

In some implementations, a stem discharge module may discharge internal steam outwards according to a user manipulation for opening a lid, thereby making it possible to automatically discharge internal steam and to remove remaining pressures in the cooker when a lid is opened.

In some implementations, manipulations for discharging steam and for opening the lid may be input through a single button, and, based on a user's single manipulation, operations of discharging steam and of decoupling a main body and the lid may be performed at a time.

In some implementations, operations of discharging steam and of opening the lid may be consecutively performed according to a user's manipulation, thereby making it impossible to open the lid before the remaining pressures in the cooker are removed.

In some implementations, the electric pressure cooker may automatically discharge internal steam and may remove remaining pressures in the cooker when the lid is opened, thereby preventing damage to the electric pressure cooker, and an explosion and a fire of the electric pressure cooker, which may be caused by an instance release of the remaining pressures.

In some implementations, the electric pressure cooker may perform the operations of discharging steam and decoupling the main body and the lid at a time according to a user's single manipulation, thereby guaranteeing safety of a user without the user's consciousness of discharge of steam prior to the opening of the lid.

Further, the electric pressure cooker makes it impossible to open the lid before the remaining pressures in the cooker are removed, thereby fundamentally eliminating a risk that may be posed by the remaining pressures in the cooker when the lid is opened.

BRIEF DESCRIPTION OF THE DRAWINGS

Implementations are described in detail with reference to the following drawings.

DETAILED DESCRIPTION

Figure 1A:
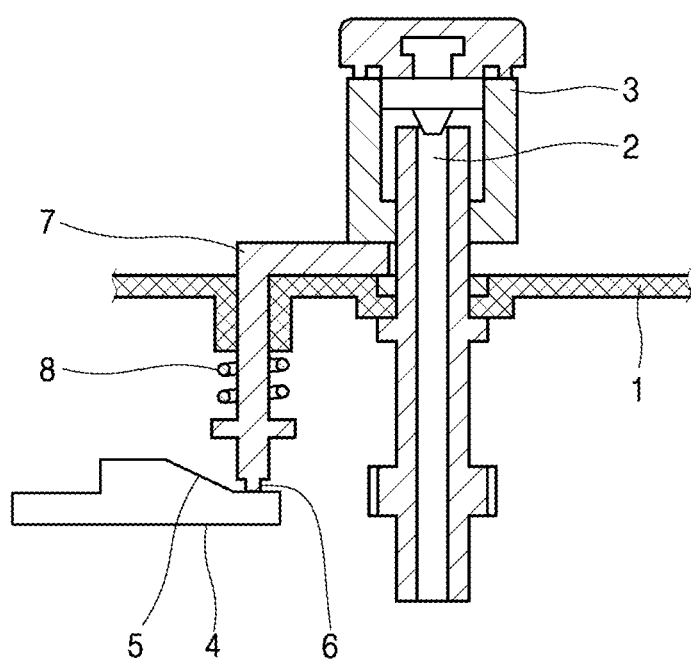
FIGS. 1A and 1B are views illustrating operations of a steam discharge device applied to an electric pressure cooker in related art.
Figure 1B:
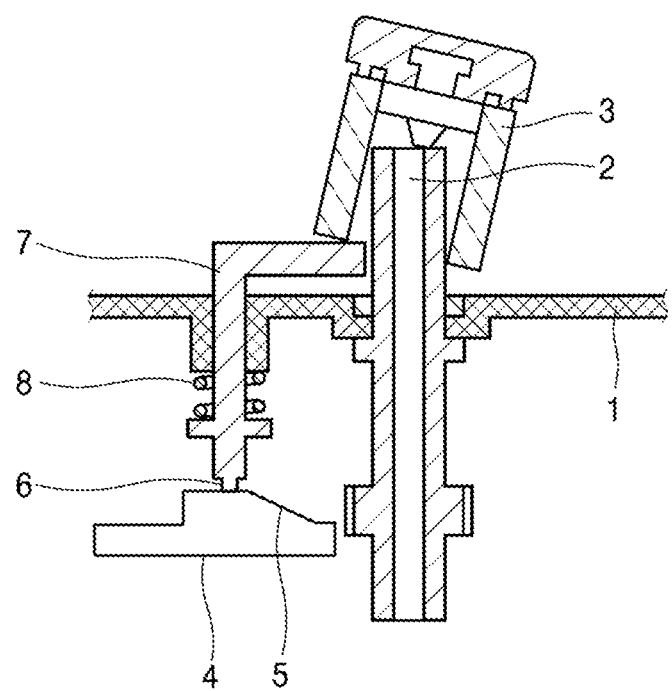

The above-described objectives, features and advantages are specifically described with reference to the attached drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, one or more implementations of the present disclosure are specifically described with reference to the attached drawings. Throughout the drawings, identical reference numerals denote identical or similar components.

The present disclosure relates to an electric pressure cooker that may remove or decrease remaining internal pressure by automatically discharging internal steam when a lid is opened. For instance, the internal pressure may be released by an operation opening the lid.

Below, an exemplary electric pressure cooker is described with reference to FIGS. 2 to 14.

Figure 2:
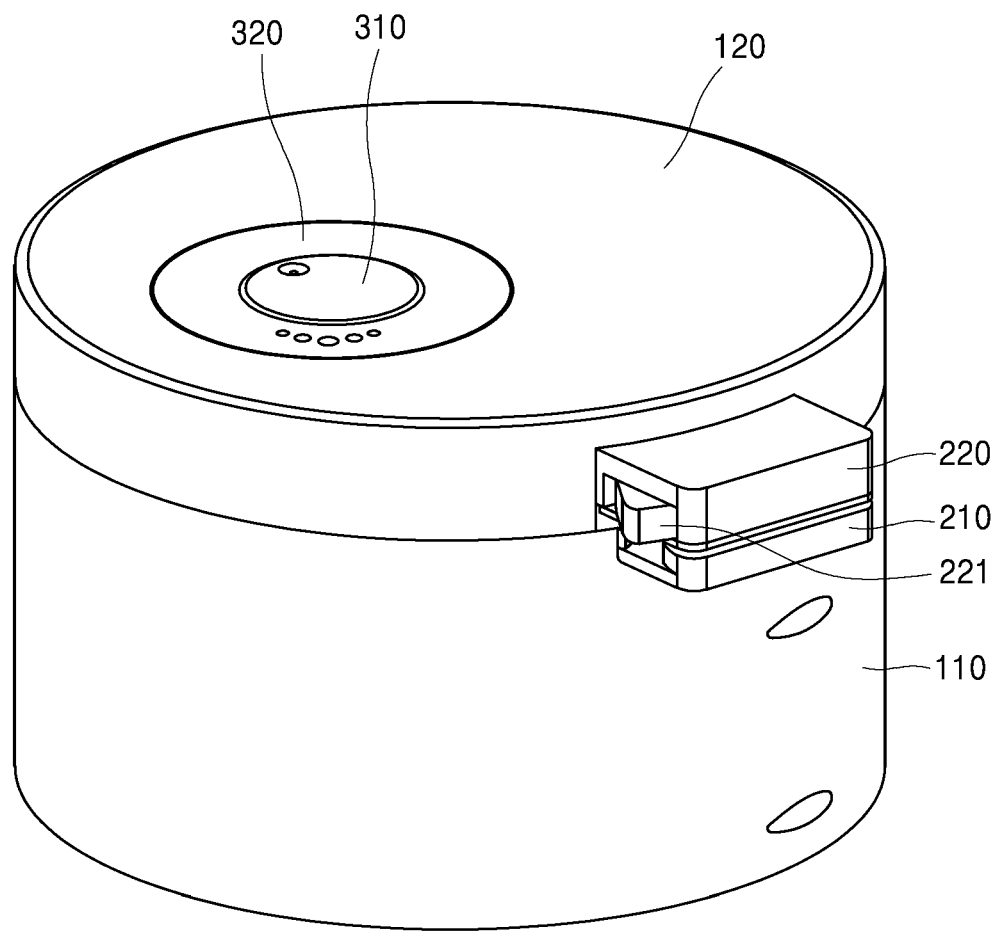
FIG. 2 is a perspective view illustrating an example of an electric pressure cooker.
Figure 3:
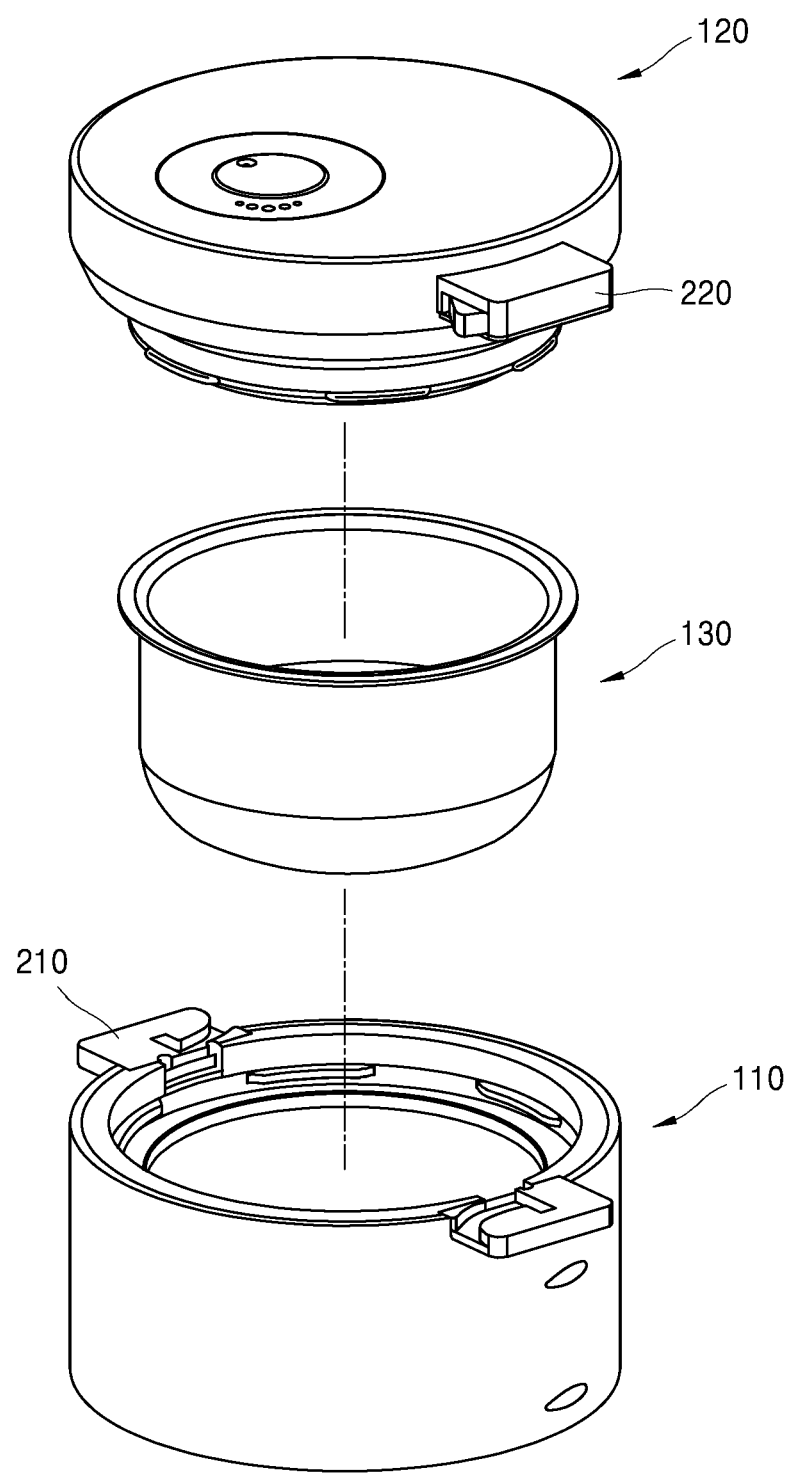
FIG. 3 is an exploded view illustrating examples of a main body, a lid, and an internal pot of the electric pressure cooker in FIG. 2.

FIG. 2 is a perspective view illustrating an exemplary electric pressure cooker, and FIG. 3 is a view illustrating the electric pressure cooker in FIG. 2 including examples of a main body, a lid, and an internal pot.

Figure 4:
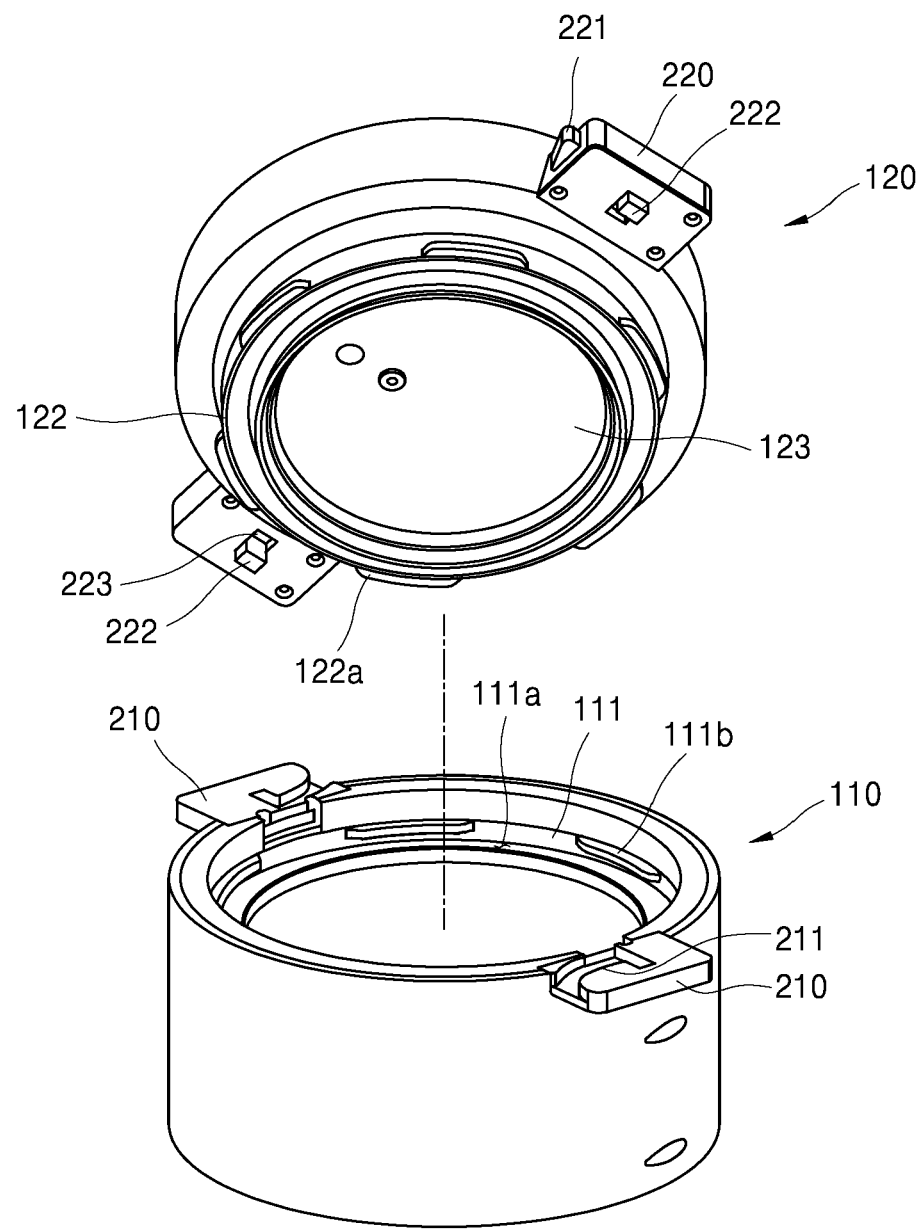
FIG. 4 is a view illustrating examples of a lid and a main body that are configured to couple to each other by rotation.
Figure 5:
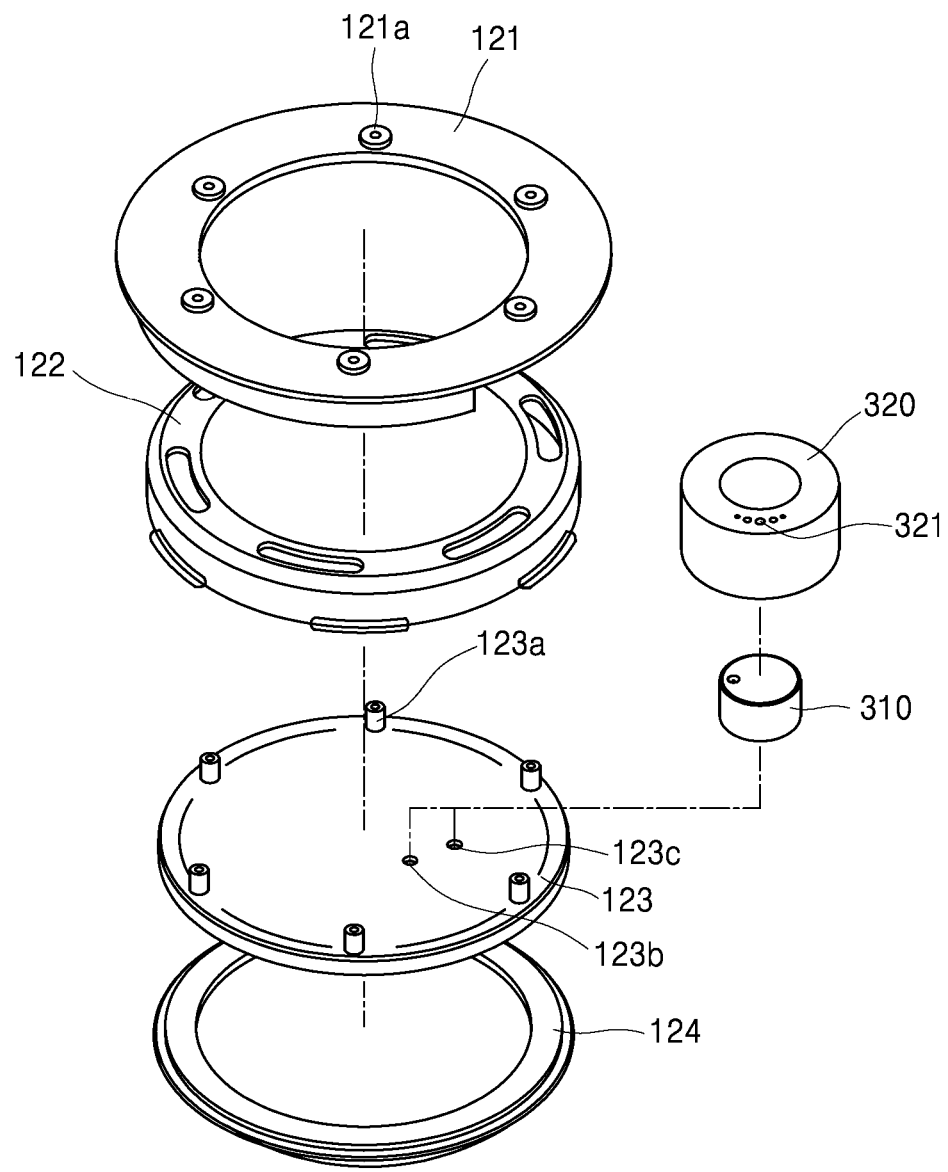
FIG. 5 is an exploded view illustrating example components of an example lid.

FIG. 4 is a view illustrating an example of a rotation-coupling of a lid and a main body. FIG. 5 is a view illustrating example components of a lid.

Figure 6:
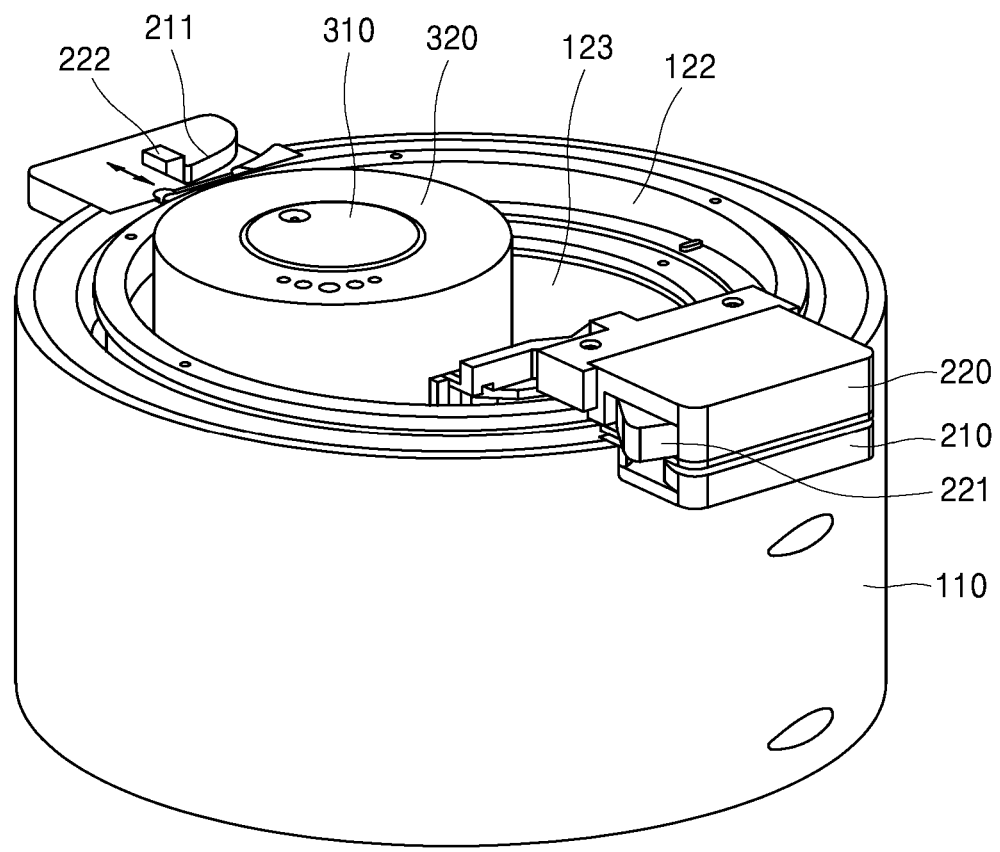
FIG. 6 is a view illustrating coupling between an example lid handle and an example main body handle by a manipulation of a button.

FIG. 6 is a view illustrating an example of coupling between a lid handle and a main body handle by a manipulation of a button.

Figure 7:
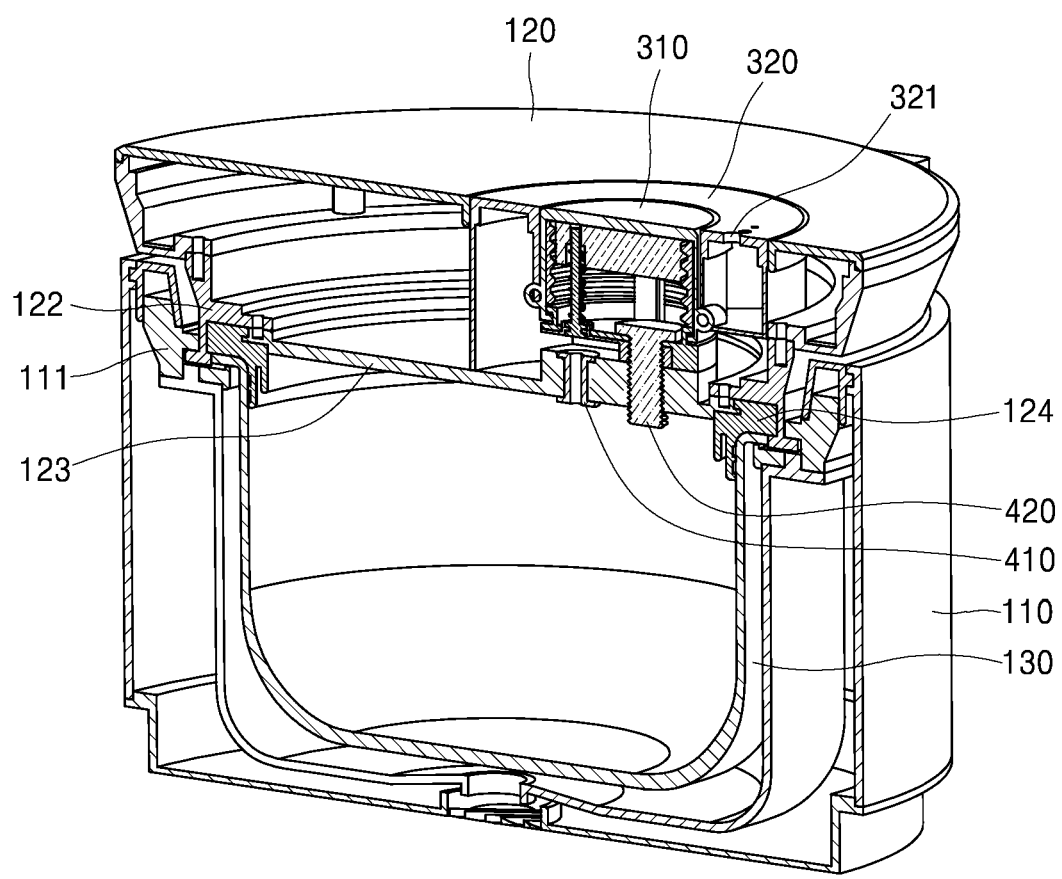
FIG. 7 is a lateral cross-sectional view illustrating the electric pressure cooker in FIG. 2.
Figure 8:
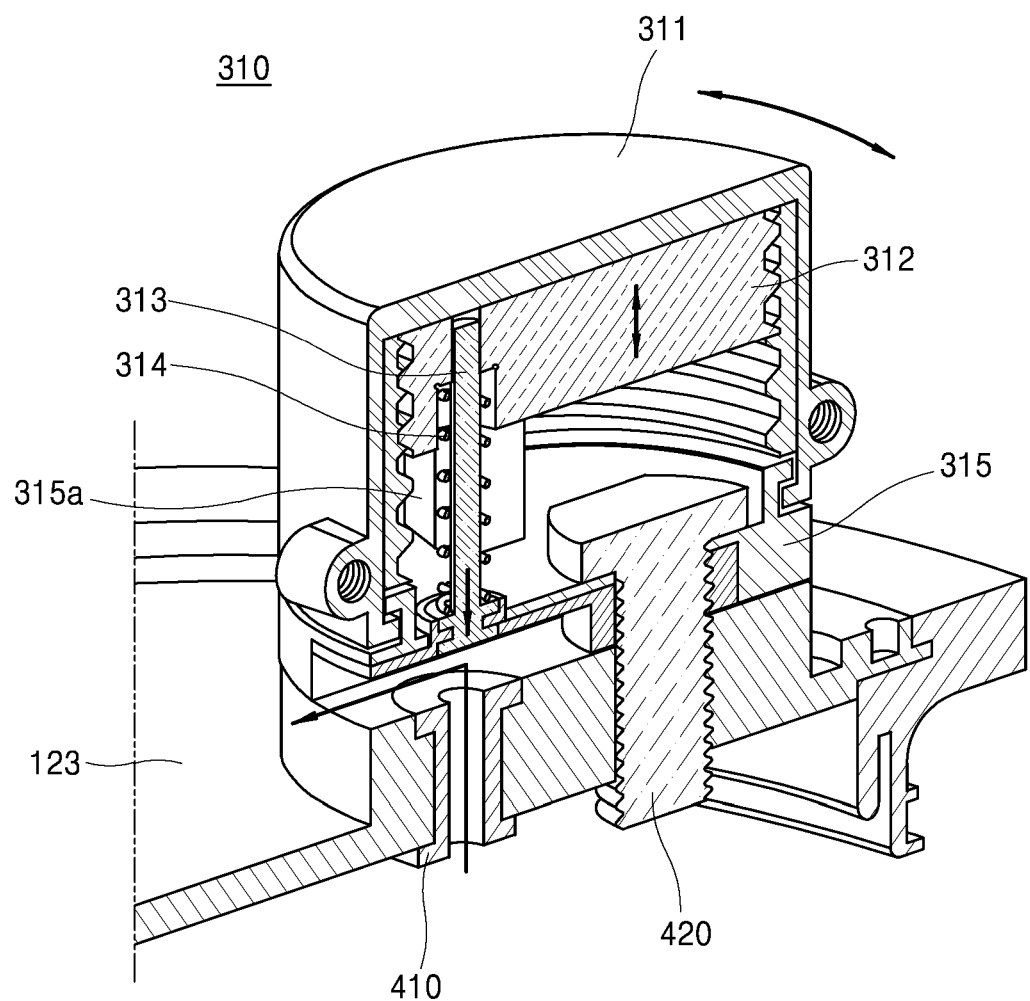
FIG. 8 is an enlarged view illustrating the steam discharge module in FIG. 7.

FIG. 7 is a lateral cross-sectional view illustrating the electric pressure cooker in FIG. 2, and FIG. 8 is an enlarged view illustrating the steam discharge module in FIG. 7.

Figure 9:
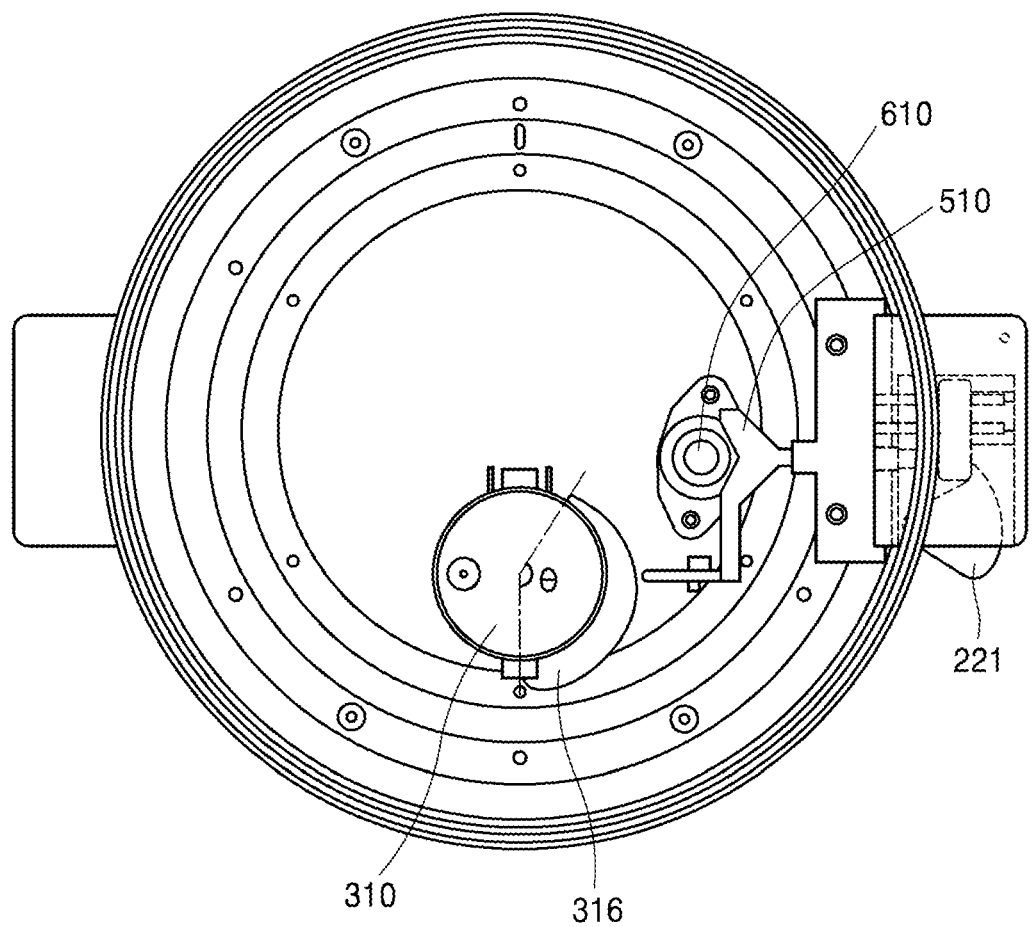
FIG. 9 is a top view illustrating example structures of an external force delivery part and a steam discharge module.
Figure 10A:
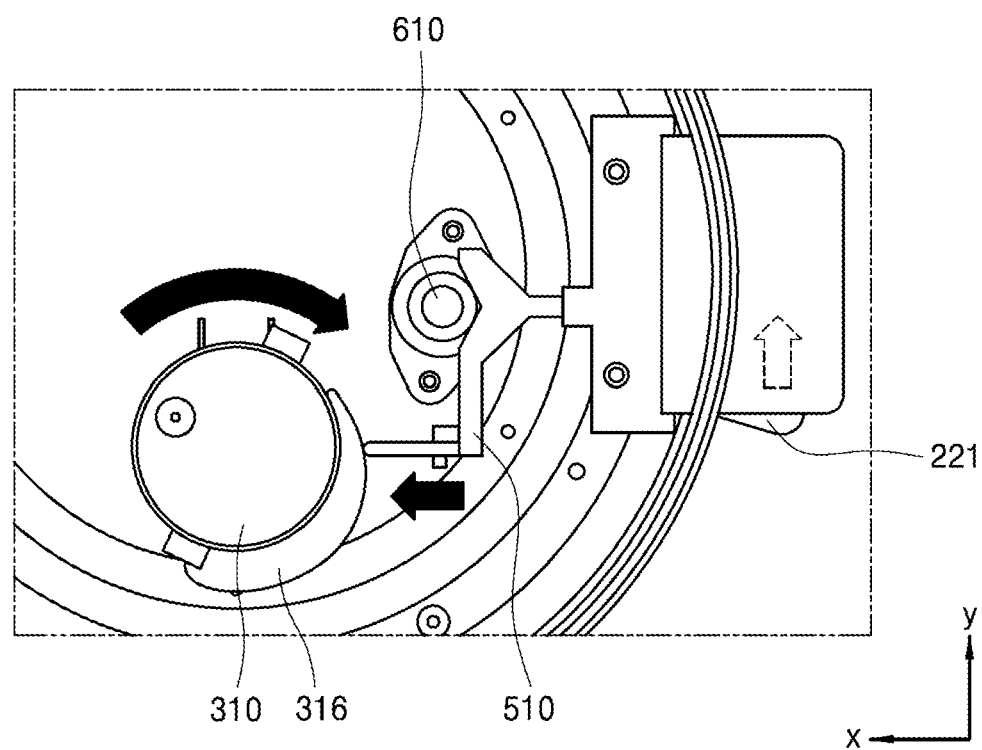
FIGS. 10A to 10C are views illustrating an example process in which the external force delivery part provides rotational force to the steam discharge module in FIG. 9.
Figure 10B:
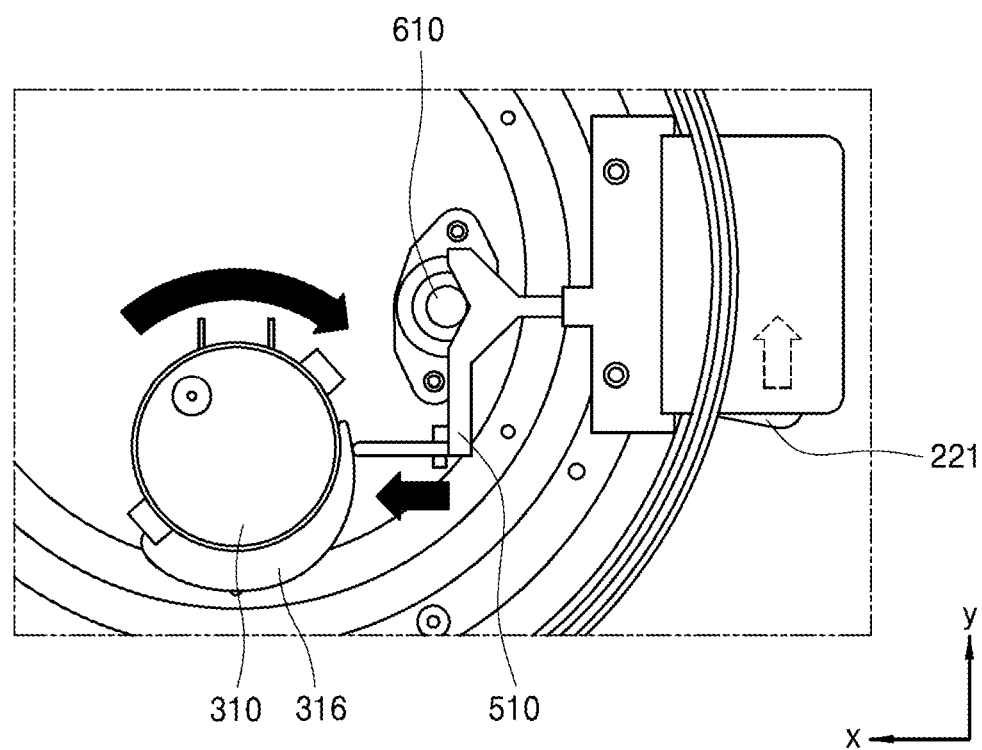
Figure 10C:
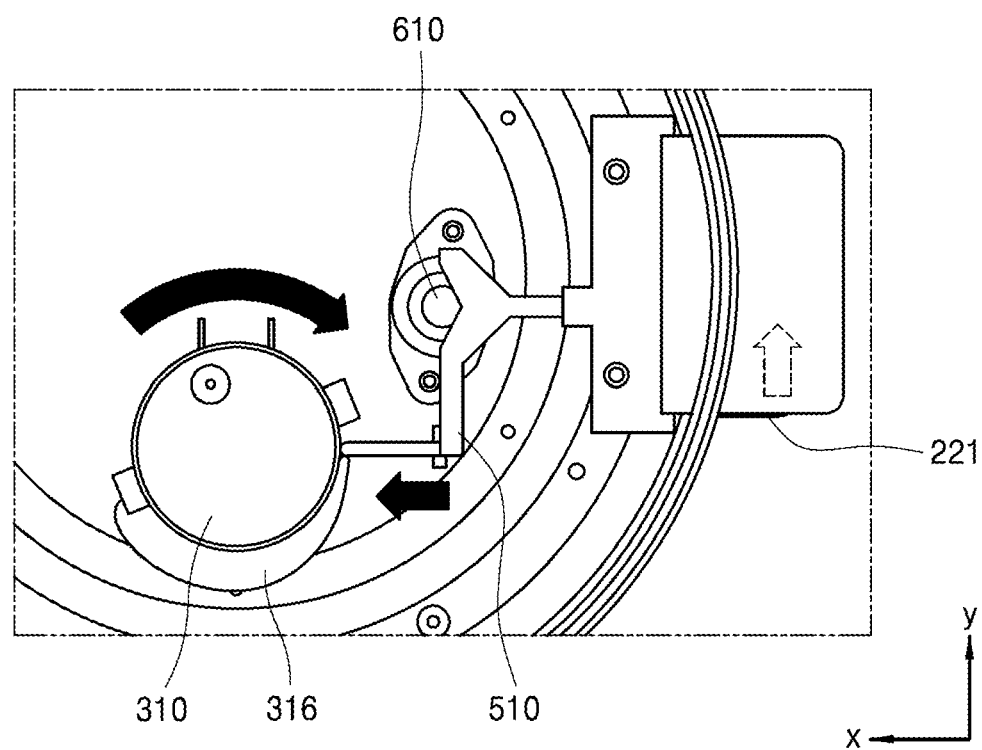

FIG. 9 is a top view illustrating example structures of an external force delivery part and a steam discharge module, and FIGS. 10A to 10C are views illustrating an example process in which the external force delivery part provides rotational force to the steam discharge module in FIG. 9.

Figure 11:
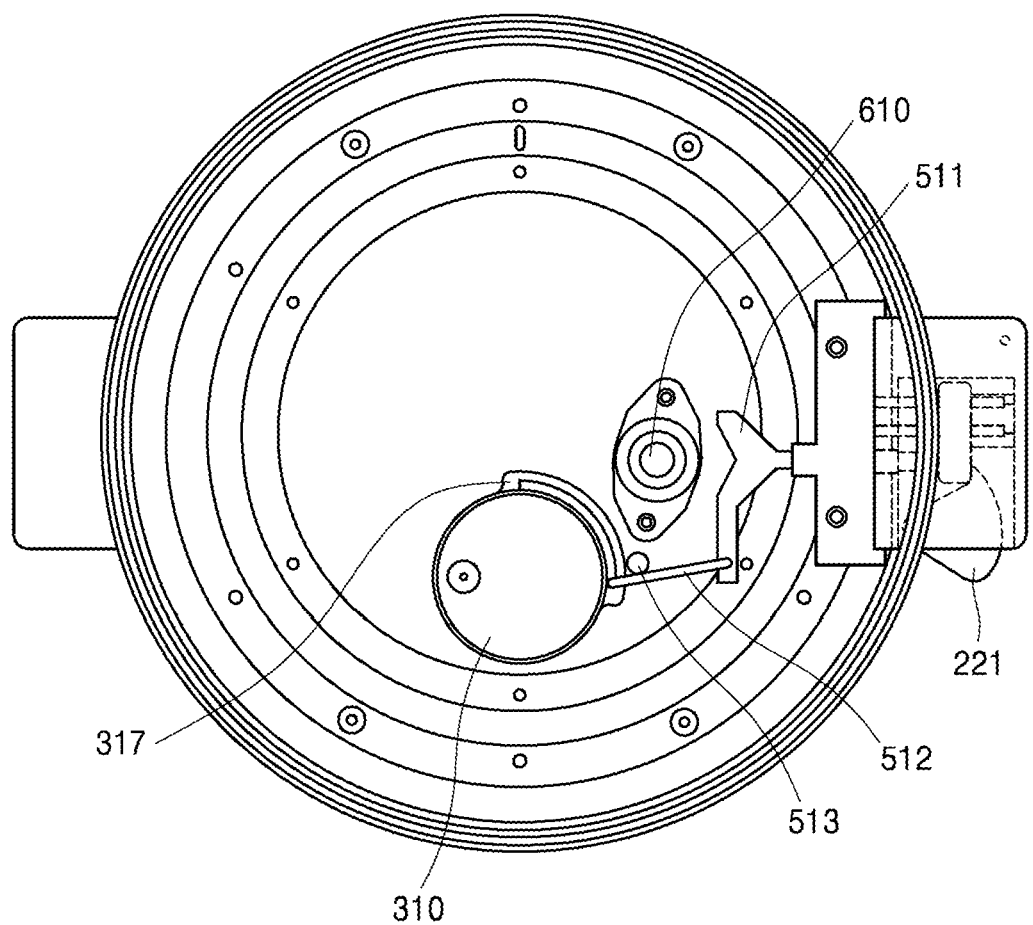
FIG. 11 is a top view illustrating example structures of an external force delivery part and a steam discharge module.

FIG. 11 is a top view illustrating example structures of an external force delivery part and a steam discharge module, and FIGS. 12a and 12b are views illustrating an example process in which the external force delivery part provides rotational force to the steam discharge module.

Figure 13:
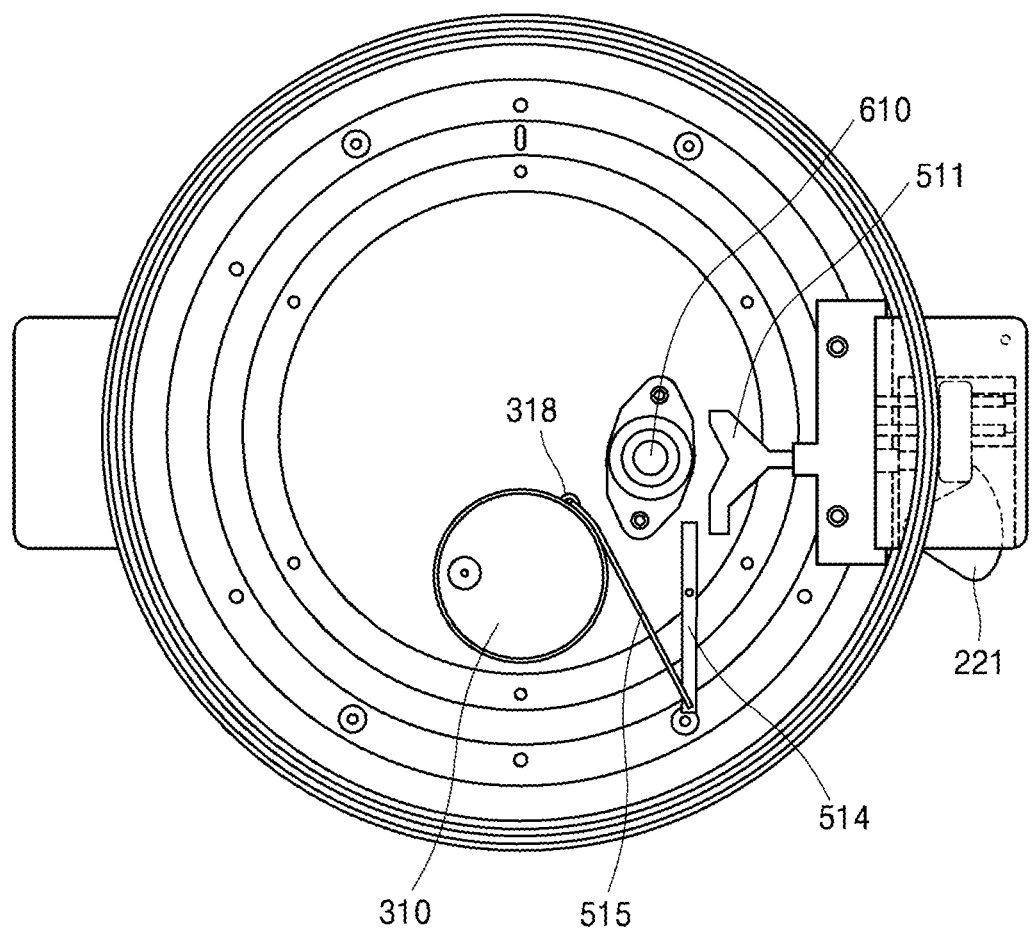
FIG. 13 is a top view illustrating example structures of an external force delivery part and a steam discharge module.
Figure 14:
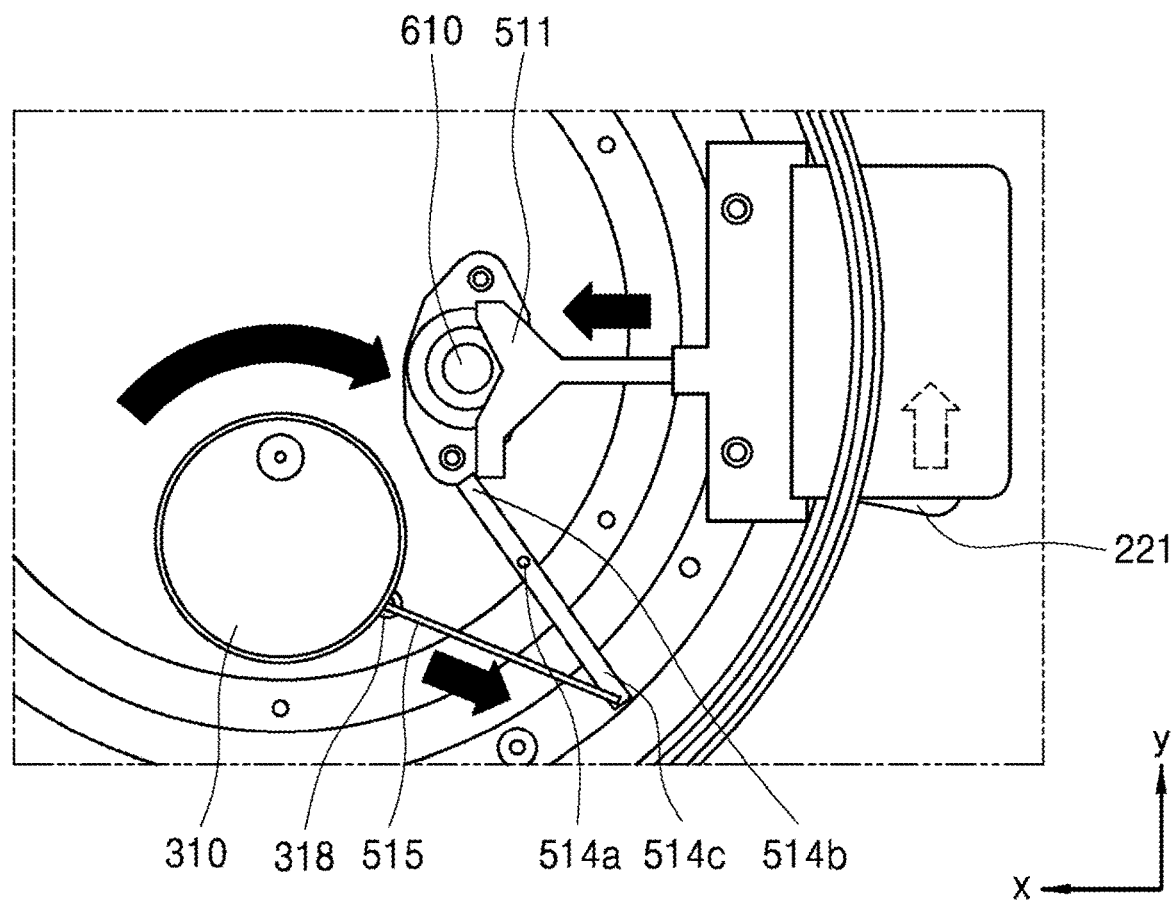
FIG. 14 is a view illustrating an example process in which the external force delivery part provides rotational force to the steam discharge module in FIG. 13.

FIG. 13 is a top view illustrating example structures of an external force delivery part and a steam discharge module, and FIG. 14 is a view illustrating an example process in which the external force delivery part provides rotational force to the steam discharge module.

In some implementations, the electric pressure cooker may be heated by a direct heating method in which heater coils installed at a lower portion and an outer lateral surface of an internal pot receive electric power and generate heat to directly heat the internal pot.

In some implementations, the electric pressure cooker may be also heated by an induction heating method in which the internal pot is heated using Joule's heat caused by eddy currents generated on a surface of the internal pot through electromagnetic induction.

Example parts and components of an electric pressure cooker are described with reference to FIGS. 2 and 3.

The electric pressure cooker 100 may include a main body 110, a lid 120, and an internal pot 130.

The main body 110, which is a case supporting a lower portion and a lateral portion of the electric pressure cooker 100, may have an opened upper surface and may have a cooking space formed in the main body 110. In the cooking space, an operation of cooking items subject to cooking may be performed. The main body 110 may define a body opening at an upper surface.

The internal pot 130 may have an opened upper surface and may be accommodated in the cooking space in the main body 110. An item subject to cooking such as grains may be put into the internal pot 130 through the opened upper surface of the internal pot 130, and may be heated and cooked in the internal pot 130.

The lid 120, which is a case sealing an upper portion of the electric pressure cooker 100, may be coupled to the opened upper surface of the main body 110 and configured to open and close the upper surface of the main body 110. In some examples, the lid 120 may be attached to and detached from the main body 110 to be completely separated from the main body 110 or to be completely coupled to the main body 110. For example, the lid 120 may be coupled to the upper surface of the main body 110 by a plurality of any coupling members provided at an upper edge of the main body 110.

The lid 120, as described above, may be completely separated from the main body 110. Accordingly, the lid 120 may be readily cleaned in relation to use of the electric pressure cooker 100.

Next, each of the parts and components constituting the lid 120 and a process in which each of the parts and components operates are described with reference to FIGS. 4 to 6. FIG. 6 is a perspective view of the lid 120, and, in FIG. 6, some parts and components constituting the lid 120 are removed for convenience of description.

Referring to FIGS. 4 and 5, the lid 120 of the disclosure may include a lid case 121, a lid coupling ring 122, an internal lid 123, and an internal pot packing 124. The lid 120 illustrated in FIGS. 4 and 5 is provided as an implementation, and parts and components of the lid 120 are not limited to those of the implementation illustrated in FIGS. 4 and 5. When necessary, some parts and components may be added, modified or removed.

The lid coupling ring 122 may be rotation-coupled to the opened upper surface of the main body 110. The rotation-coupling may denote any coupling in which a lid coupler is coupled to or decoupled from the upper surface of the main body 110 by horizontally rotating with respect to the opened upper surface of the main body 110.

As illustrated in FIG. 4, the lid coupling ring 122 may have a ring shape that extends along a perimeter of the lid 120. The main body 110 may include a main body coupling ring 111 having a ring shape that extends along a perimeter of the upper surface of the main body 110 to correspond to the shape of the lid coupling ring 122. In this case, the lid coupling ring 122 may be rotation-coupled to the main body coupling ring 111.

Specifically, the lid coupling ring 122 may be rotation-coupled to the main body coupling ring 111 by being inserted into a coupling groove 111A formed at the main body coupling ring 111 and then by being rotated.

As illustrated in FIG. 4, the lid coupling ring 122 may protrude downwards, and the main body coupling ring 111 may include the coupling groove 111A that is depressed downwards. Accordingly, the lid coupling ring 122 may be inserted into the coupling groove 111A of the main body coupling ring 111.

The lid coupling ring 122 may be inserted into the coupling groove 111A of the main body coupling ring 111 and then may be rotated horizontally with respect to the main body coupling ring 111 such that the lid coupling ring 122 is rotation-coupled to the main body coupling ring 111. To this end, the lid coupling ring 122 and the main body coupling ring 111 may respectively include a pair of any coupling members that are engaged with each other when the lid coupling ring 122 is rotated and that couples the lid coupling ring 122 to the main body coupling ring 111.

For example, the lid coupling ring 122 may include a plurality of stopping jaws 122*a*, and the main body coupling ring 111 may include a plurality of guide jaws 111B, as illustrated in FIG. 4. When the lid coupling ring 122 is inserted into the coupling groove 111A of the main body coupling ring 111 and then is rotated, the plurality of stopping jaws 122*a* may be moved circumferentially with respect to the plurality of guide jaws 111B and may be engaged with the plurality of guide jaws 111B respectively.

Specifically, the plurality of stopping jaws 122*a* may protrude in one horizontal direction (e.g., an outward direction). The plurality of guide jaws 111B may protrude in the other horizontal direction (e.g., an inward direction) that is a direction opposite to the direction in which the plurality of stopping jaws 122*a* protrude. Accordingly, the stopping jaw 122*a* and the guide jaw 111B may be engaged with each other circumferentially when the lid coupling ring 122 is rotated with respect to the main body coupling ring 111.

In other words, in a state in which the stopping jaw 122*a* and the guide jaw 111B are arranged circumferentially not to meet each other, the lid coupling ring 122 may be inserted into the main body coupling ring 111. When the lid coupling ring 122 is rotated in the state of being inserted into the main body coupling ring 111, the stopping jaw 122*a* may be moved circumferentially with respect to the guide jaw 111B, and, when the lid coupling ring 122 is rotated with respect to the main body coupling ring 111 by a certain angle, the plurality of stopping jaws 122*a* may be completely engaged with the plurality of guide jaws 111B.

When the stopping jaw 122*a* is completely engaged with the guide jaw 111B, as long as the lid coupling ring 122 is not rotated in an opposite direction, the lid 120 may not be separated from the main body 110 although an external force is applied perpendicularly (upwards or downwards) to the lid 120 and the main body 110.

The coupling of the lid 120 and the main body 110 is described above with reference to the structure of the lid coupling ring 122 illustrated in FIG. 4. However, the lid coupling ring 122 of the disclosure may be rotation-coupled to the upper surface of the main body 110 through various structures used in the art to which the disclosure pertains, in addition to the structure illustrated in FIG. 4.

Referring back to FIG. 5, the lid case 121 may be disposed at an upper portion of the lid coupling ring 122. The lid case 121 may be disposed at the upper portion of the lid coupling ring 122 in a shape correspond to the shape of the lid coupling ring 122 for aesthetic qualities of the lid 120. For example, when the lid coupling ring 122 has a ring shape, the lid case 121 may have a ring shape that covers the lid coupling ring 122 such that the lid coupling ring 122 is not exposed outwards.

The internal lid 123 may be disposed inside the lid coupling ring 122. Specifically, the internal lid 123 may be disposed along an inner surface of the lid coupling ring 122. As illustrated in FIG. 5, the internal lid 123 is basically disposed on a lower surface of the lid coupling ring 122, and, when an outer circumferential surface of the lid coupling ring 122 has a certain height perpendicularly, the internal lid 123 may be disposed along an inner circumferential surface of the lid coupling ring 122.

The lid case 121 and the internal lid 123 may be coupled with the lid coupling ring 122 therebetween. Specifically, the lid case 121 may be provided with a first coupling member 121A, and the internal lid 123 may be provided with a second coupling member 123*a*. The first coupling member 121A and the second coupling member 123*a* may be coupled with each other with the lid coupling ring 122 therebetween, and, accordingly, the lid case 121, the lid coupling ring 122, and the internal lid 123 may be integrally coupled.

The internal lid 123 may have a flat plate shape at which at least one steam inlet 123*b* is formed, to block the upper surface of the internal pot 130.

The steam inlet 123*b*, which is a hole introducing steam generated inside the internal pot 130, may be connected with a part and a component for discharging steam. Specifically, a below-described steam discharge module 310 may be provided on the upper surface of the internal lid 123, and the steam discharge module 310 may be connected with the steam inlet 123*b* and may discharge steam inside the internal pot 130 outwards.

The lid 120 may further include the internal pot packing 124 that is assembled along a perimeter of the internal lid 123 and that seals a space between the internal lid 123 and the internal pot 130 such that a path into which steam generated in the internal pot 130 is introduced is limited to the steam inlet 123*b*.

The internal lid 123, as described above, may block the upper surface of the internal pot 130. Even in this case, a gap through which steam may flow may be formed between the internal lid 123 and the internal pot 130. For example, when the internal lid 123 has a circular flat plate shape and the internal pot 130 has a cylindrical shape, a radius of the internal lid 123 may be smaller than a radius of a horizontal cross section of the internal pot 130. In this case, a gap through which steam may flow may be formed between the internal lid 123 and the internal pot 130 due to a difference between the radiuses of the internal lid 123 and the internal pot 130.

The internal pot packing 124 may be assembled along the perimeter of the internal lid 123 and may seal a gap between the internal lid 123 and the internal pot 130. Accordingly, steam generated in the internal pot 130 may not be discharged through any part without passing through the steam inlet 123b, and pressure of steam generated in the internal pot 130 may be maintained and controlled.

The lid 120 may further include a lid handle 220. The lid handle 220 may be fixedly provided at both lateral ends of the lid 120 (e.g., the lid case 121), and may be provided with a button 221 at one side of the lid handle 220. The main body 110 may further include a main body handle 210. The main body handle 210 may be fixedly provided at both lateral ends of the main body 110 in a position corresponding to a position of the lid handle 220.

The lid handle 220 may be horizontally swiveled and may deliver a rotational force to the lid coupling ring 122 in a complete manipulation state of the button 221. Accordingly, the lid coupling ring 122 may be decoupled with respect to the upper surface of the main body 110.

A manipulation state of the button 221 may be classified into a manipulation state and a non-manipulation state based on a degree of a manipulation of the button 221 when the lid coupler is rotation-coupled with respect to the upper surface of the main body, and the manipulation state may also be classified into a complete manipulation state and an incomplete manipulation state.

For example, when the button 221 has a structure in which the button 221 is inserted towards an inside of the lid handle 220 by an external force applied by a user as illustrated in FIGS. 4 and 6, a state in which the button 221 is completely inserted may be defined as a complete manipulation state, a state in which the button 221 is being inserted may be defined as an incomplete manipulation state, and a state in which no manipulation is performed to the button 221 may be defined as a non-manipulation state.

Additionally, when the button 221 has any structure in which the button 221 is moved linearly by an external force by a certain range of distances, a complete manipulation state may denote a state in which a distance moved by the button 221 is a maximum distance, an incomplete manipulation state may denote a state in which a distance moved by the button 221 is shorter than a maximum distance, and a non-manipulation state may denote a state in which the button 221 is not moved.

Referring to FIG. 4, the lid handle 220 may include a coupling projection 222 that is provided to move horizontally in outward and inward directions of the lid 120 on a lower surface of the lid handle 220. Specifically, the coupling projection 222 may horizontally move along a projection guide hole 223 formed on the lower surface of the lid handle 220 in the outward and inward directions of the lid 120.

The coupling projection 222 may be fixed in the outward direction of the lid 120 along the projection guide hole 223 in the non-manipulation state of the button 221, and, based on a degree of a manipulation of the button 221, may move along the projection guide hole 223 in the inward direction of the lid 120.

The main body handle 210 may be provided with a slide groove 211 guiding the coupling projection 222 on an upper surface of the main body handle 210. One end of the slide groove 211 may be openly formed at one lateral surface of the main body handle 210, and the other end of the slide groove 211 may be bent and formed in an outward direction of the main body 110.

When the lid coupling ring 122 is inserted into the main body coupling ring 111 and is rotated circumferentially as illustrated in FIG. 4, the coupling projection 222 provided on the lower surface of the lid handle 220 may be inserted into opened one end of the slide groove 211 formed on the upper surface of the main body handle 210 and may slide along the slide groove 211 and, when the lid coupling ring 122 is rotated with respect to the main body coupling ring 111 at a certain angle, the coupling projection 222 that is sliding along the slide groove 211 may be horizontally inserted into and fixed to the bent other end of the slide groove 211.

After the lid 120 is rotation-coupled to the main body 110, the lid handle 220 may be horizontally swiveled and may deliver a rotation force to the lid coupling ring 122 in the complete manipulation state of the button 221.

Specifically, when the button 221 is manipulated, the coupling projection 222 inserted into and fixed to the bent other end of the slide groove 211 may move in the inward direction of the lid 120 and may come out of the bent other end of the slide groove 211.

In the complete manipulation state of the button 221, the coupling projection 222 may completely come out of the bent other end of the slide groove 211, and, in this case, the lid handle 220 may horizontally swivel and may deliver a rotational force to the lid coupling ring 122. Accordingly, the lid coupling ring 122 may rotate circumferentially with respect to the main body coupling ring 111, and the rotation-coupling of the lid coupling ring 122 and the main body coupling ring 111 may be undone.

The steam discharge module 310 may horizontally swivel, and may discharge steam, introduced from the inside of the internal pot 130 through the steam inlet 123b formed at the internal lid 123, outwards.

The steam discharge module 310, as illustrated in FIG. 5, may be fixedly provided on the upper surface of the internal lid 123. Specifically, any coupling member may be fixedly provided in the steam discharge module 310, and the coupling member may be coupled to a coupling hole 123c formed at the internal lid 123. Accordingly, the steam discharge module 310 may be fixedly provided on the upper surface of the internal lid 123.

Additionally, the steam discharge module 310 may be provided on the steam inlet 123b to block the steam inlet 123b through perpendicular pressure. As a result, the steam discharge module 310 may be fixedly provided on the upper surface of the internal lid 123 through the above-described coupling member, on the steam inlet 123b.

The steam discharge module 310 may horizontally swivel in its place with respect to a central perpendicular line of the steam discharge module 310, and, based on a swivel angle, may discharge steam outwards.

In some implementations, the steam discharge module 310 may block the steam inlet 123b at a pressure determined based on the swivel angle. Specifically, the steam discharge module 310 may swivel in its place at a reference position by a predetermined angle, and may block the steam inlet 123b at a pressure proportional to an angle at which the steam discharge module 310 swivels with respect to the reference position.

A rotation angle may be proportional to a rotational force applied to a steam pressure module. In this case, the steam discharge module 310 may block the steam inlet 123*b* at a pressure determined based on a rotational force applied from the outside.

For example, the steam discharge module 310 may be provided with any member that converts a rotational force applied from the outside into a perpendicular force, and any member that applies a perpendicular pressure to the steam inlet 123*b* using the converted perpendicular force.

Thus, an amount of steam discharged through the steam discharge module 310 may be increased or decreased based on a swivel angle of the steam discharge module 310 or a rotation force applied to the steam discharge module 310.

Further, the internal lid 123 may be further provide with a noise reduction module 320 that surrounds the steam discharge module 310 and that allows steam discharged by the steam discharge module 310 to pass through a sound absorption member, to reduce noise generated by the discharge of steam, at the upper portion of the internal lid 123.

The noise reduction module 320 may be provided with any sound absorption member therein. For example, the sound absorption member may include a porous member that reduces noise through micro holes formed on a surface of the porous member or in the porous member, or a plate-type member that reduces noise through vibrations of the plate, and the like.

The noise reduction module 320 may include a perpendicular outlet 321 on an upper surface of the noise reduction module 320. The noise reduction module 320 may form a steam flow path for discharging steam horizontally discharged by the steam discharge module 310 through the perpendicular outlet 321, and, to this end, may be disposed to surround the steam discharge module 310.

Accordingly, the steam discharged by the steam discharge module 310 may pass through the sound absorption member in the noise reduction module 320 and then may be discharged through the perpendicular outlet 321 formed at the upper portion of the noise reduction module 320 outwards.

Below, detailed configurations and operations of the steam discharge module 310 are described with reference to FIGS. 7 and 8. In FIG. 8, the noise reduction module 320 is removed for convenience of description.

Referring to FIGS. 7 and 8, the steam discharge module 310 may be disposed on the steam inlet 123*b* formed at the internal lid 123, and may block the steam inlet 123*b*. Specifically, the steam discharge module 310 may be coupled with the internal lid 123 through a screw 420 inserted downwards in the steam discharge module 310 and bolt-coupled with the internal lid 123.

The steam discharge module 310 may include a lower plate 315, a housing 311, a spring guide 312 and a pressure pipe 313.

The lower plate 315 may form a bottom surface of the steam discharge module 310, and may be coupled with the internal lid 123 through the screw 420. Accordingly, the lower plate 315 may be fixedly coupled to the internal lid 123.

The housing 311 may be provided at an upper portion of the lower plate 315 and may be engaged with the lower plate 315 to horizontally swivel with respect to the lower plate 315.

The housing 311 may include a screw groove on an inner surface of the housing 311. The screw groove may be provided at a slant along the inner surface of the housing 311. Specifically, the screw groove may be provided along the inner surface of the housing 311 in the form of a vortex-shaped curve extending from the lower plate 315 to an upper surface of the housing 311.

The spring guide 312 may include a screw thread coupled to the screw groove provided on the inner surface of the housing 311, and, according to a swivel of the housing 311, may ascend or descend in the housing 311.

The spring guide 312 may ascend and descend. For example, the spring guide 312 may be provided in the housing 311 such that the swivel of the spring guide 312 is limited. Specifically, a rotation limitation pillar 315*a* protruding upwards from the bottom surface of the lower plate 315 may be inserted into a groove formed perpendicularly at the spring guide 312.

Accordingly, even when a rotation force is delivered to the spring guide 312 at the time of a swivel of the housing 311, the swivel of the spring guide 312 may be limited by the rotation limitation pillar 315*a*. The spring guide 312 may ascend and descend based on a depth to which the rotation limitation pillar 315*a* is inserted into the groove formed at the spring guide 312.

Specifically, because the swivel of the spring guide 312 is limited, the screw groove on the inner surface of the housing 311, coupled to a screw thread of the spring guide 312, may swivel when the housing 311 swivels with respect to the spring guide 312, and the spring guide 312 may ascend or descend in the housing 311 according to a relative swivel of the screw thread and the screw groove.

The pressure pipe 313 may seal the steam inlet 123*b* based on an elastic force of a spring 314 one end of which is fixed to the spring guide 312.

The pressure pipe 313 and the steam inlet 123*b* may be disposed on the same perpendicular line, and the pressure pipe 313 may be disposed to pass through an opening formed at the lower plate 315 and to apply certain pressure to the steam inlet 123*b*. To this end, the pressure pipe 313 may be provided in the spring 314.

The spring 314 may surround the pressure pipe 313. One end of the spring 314 may be fixed to the spring guide 312 and the other end of the spring 314 may be fixed to an end of the pressure pipe 313.

When the spring guide 312 ascends, a length of the spring 314 may be increased, and, accordingly, an elastic force of the spring 314 may be decreased. When the spring guide 312 descends, the length of the spring 314 may be decreased, and, accordingly, the elastic force of the spring 314 may be increased. By the elastic force of the spring 314, the pressure pipe 313 may seal the steam inlet 123*b*.

In summary, the steam discharge module 310 may discharge steam or may block the discharge of steam, by optionally sealing the steam inlet 123*b* at a pressure determined based on a rotation angle of the housing 311 that horizontally swivels.

The steam inlet 123*b* may further include a packing member 410 in order for the steam inlet 123*b* to be sealed more efficiently. The packing member 410, as illustrated in FIG. 8, may be provided along the inner surface of the steam inlet 123*b* by passing through the internal lid 123.

The packing member 410 may include any material having elasticity. Accordingly, when the pressure pipe 313 applies a downward pressure to the steam inlet 123*b*, the packing member 410 provided at the steam inlet 123*b* may be partially deformed, and the steam inlet 123*b* may be completely sealed by a restoring force caused by the elasticity of the packing member 410.

The process of discharging steam by the steam discharge module 310 is described above with reference to the structures illustrated in FIGS. 7 and 8. However, the steam discharge module 310 of the disclosure may have any structure in which the steam discharge module 310 discharges steam in the internal pot 130 outwards, or blocks the discharge of steam by swiveling in its place, in addition to the structures in FIGS. 7 and 8.

An external force delivery part may provide a rotational force to the steam discharge module 310 using an external force delivered through the button 221 in the incomplete manipulation state of the button 221.

The external force delivery part may be provided in the lid 120. The external force delivery part may be directly or indirectly connected with the button 221 to receive an external force delivered through the button 221, and may be directly or indirectly connected with the steam discharge module 310 to deliver the external force delivered through the button to the steam discharge module 310 as a rotation force.

The external force delivery part may be provided with a connection member 510 for converting an external force delivered through the button 221 into a rotational force. For example, when a linear-direction external force is applied to the button 221, the external force delivery part may be provided with the connection member 510 for converting the linear-direction external force into a rotational force.

The steam discharge module 310 may horizontally swivel according to the rotational force supplied through the external force delivery part to discharge steam outwards.

Specifically, the steam discharge module 310 may receive a rotation force through the external force delivery part in the incomplete manipulation state of the button 221, and may horizontally swivel based on the rotational force delivered from the external force delivery part to discharge steam, introduced from the inside of the internal pot 130 through the steam inlet 123b, outwards.

The operation of discharging steam by the steam discharge module 310 is described above. Accordingly, detailed description in relation to this is omitted.

In the manipulation state of the button 221, an incomplete manipulation state may be converted into a complete manipulation state based on a degree of a manipulation of the button 221, as described above. For example, in the case of a button 221 with the structure in FIG. 6, the manipulation state of the button 221 may be an incomplete manipulation state while the button 221 is being inserted by an external force, and the manipulation state of the button 221 may be a complete manipulation state when the button 221 is completely inserted.

The external force delivery part may provide a rotational force to the steam discharge module 310 in the incomplete manipulation state of the button 221. In other words, the external force delivery part may control the steam discharge module 310 such that the steam discharge module 310 discharges steam outwards, by providing a rotational force to the steam discharge module 310 while the button 221 is being inserted.

As described above, when the button 221 is completely inserted and the manipulation state of the button 221 is converted into a complete manipulation state, the lid handle 220 may operate. That is, the lid handle 220 may horizontally swivel and may deliver a rotational force to the lid coupling ring 122 in the complete manipulation state of the button 221 after the steam discharge module 310 discharges steam outwards in the incomplete manipulation state of the button 221.

Accordingly, when the user manipulates the button 221 provided at the lid handle 220 to separate the lid 120 from the main body 110, steam, which is generated in the internal pot 130 before the lid handle 220 swivels, may be discharged outwards through the steam discharge module 310.

According to the present disclosure, as described above, it is impossible to open the lid before the remaining pressures in the cooker are removed, thereby fundamentally eliminating a risk that may be posed by the remaining pressures in the cooker when the lid is opened.

Additionally, when pressure in the internal pot 130 is reduced to pressure less than predetermined pressure according to the operation of discharging steam by the steam discharge module 310, the lid handle 220 may horizontally swivel and may deliver a rotational force to the lid coupling ring 122.

The operation of discharging steam by the steam discharge module 310 requires a certain period of time. Accordingly, the manipulation state of the button 221 may be converted into a complete manipulation state while steam is being discharged outwards through the steam discharge module 310.

In this case, when the lid handle 220 swivels, and the lid 120 and the main body 110 are separated, the lid 120 may escape from the main body 110 abnormally due to the remaining pressures in the internal pot 130. To prevent the abnormal escape, the lid handle 220 may horizontally swivel only when pressure in the internal pot 130 is reduced to pressure less than the predetermined pressure.

In some implementations, the electric pressure cooker 100 may include a manipulation limitation member that maintains the button 221 in an incomplete manipulation state until pressure in the internal pot 130 is reduced to pressure less than the predetermined pressure. In some examples, the manipulation limitation member may be a mechanical part such as a rod, a hook, etc. that may restrict movement of the button. In some examples, the manipulation limitation member may be a controller or a processor including an electric circuit.

For example, the electric pressure cooker 100 may further include an electronic pressure sensor that is provided to pass through the internal lid 123, and a control module that limits a manipulation state of the button 221 as a manipulation limitation member. The electronic pressure sensor may measure a pressure of steam (vapor pressure) generated in the internal pot 130 and may provide the measured pressure to the control module, and the control module may compare the measured vapor pressure with the predetermined pressure.

When the vapor pressure is greater than the predetermined pressure, the control module may maintain the manipulation state of the button 221 in an incomplete manipulation state. Specifically, the lid handle 220 may be further provided with any stopping member that limits movements of the button 221 according to a control signal, in the lid handle 220, and the control module may supply a control signal to the stopping member when the vapor pressure is greater than the predetermined pressure.

The stopping member may limit movements of the button 221 according to a control signal, thereby preventing the conversion of the button 221 from an incomplete manipulation state to a complete manipulation state.

In another example, the electric pressure cooker 100 of the disclosure may further include a pressure weight 610 that is provided to pass through the internal lid 123 as a manipulation limitation member. The pressure weight 610 may ascend in an upper direction of the internal lid 123 based on a pressure of steam generated in the internal pot 130.

Specifically, the pressure weight 610 may be provided to move upwards and downwards in contact with an inner surface of a penetration hole formed at the internal lid 123, and may have a structure that seals the inside of the internal pot 130. In other words, when vapor pressure in the internal pot 130 is increased, the pressure weight 610 ascends in the upper direction of the internal lid 123, and even when the pressure weight 610 ascends at a maximum level, steam may not be discharged through the penetration hole provided with the pressure weight 610.

The pressure weight 610 may ascend in the upper direction of the internal lid 123 on a path of delivery of an external force applied to the button 221.

The external force delivery part, as described above, may include a connection member 510 for converting an external force delivered through the button 221 into a rotational force. When the button 221 is inserted by an external force, the connection member 510 may move in any direction and may convert the external force delivered through the button 221 into a rotational force.

In this case, the pressure weight 610 may ascend in the upper direction of the internal lid 123 on a path of movements of the connection member 510, and when the pressure weight 610 ascends, movements of the connection member 510 may be limited. Accordingly, the conversion of the button 221 from an incomplete manipulation state to a complete manipulation state may be prevented.

As a result, the manipulation state of the button 221 may be maintained in an incomplete manipulation state until the remaining pressures in the internal pot 130 are removed by the above-described manipulation limitation member, and the manipulation state of the button 221 may be converted into a complete manipulation state only after the remaining pressures in the internal pot 130 are totally removed. Thus, according to the present disclosure, when the user separates the lid 120 from the main body 110 through a handle of the internal pot 130, safety problems triggered by the remaining pressures in the internal pot 130 may be solved.

Below, implementations in which an external force delivery part delivers an external force to the steam discharge module 310 are described with reference to FIGS. 9 to 14.

FIG. 9 and FIGS. 10A to 10C illustrate an example structure of an external force delivery part and a process in which the external force delivery part operates.

Referring to FIG. 9, the external force delivery part may include a connection member 510 that is connected with the button 221 and that is moved in a linear direction by an external force delivered through the button 221. The steam discharge module 310 may include a spiral-shaped rotation guide member 316 that is horizontally provided on an outer surface of the steam discharge module 310 and that converts a linear-direction external force delivered by the connection member 510 into a rotational force.

In the case of a button 221 having a structure in which the button 221 is inserted in the inner direction (hereinafter referred to as "y-axis direction") of the lid handle 220, when a y-axis-direction external force is applied to the button 221, the connection member 510 may be moved in an inward direction (hereinafter referred to as "x-axis direction") of the lid 120. In this case, a distance moved by the connection member 510 may be increased based on magnitude of an external force applied to the button 221.

The rotation guide member 316 may be fixedly provided on the outer surface of the steam discharge module 310, and may be horizontally formed with respect to a central point of the steam discharge module 310 within a predetermined range of central angles (θ). The rotation guide member 316 may have a spiral shape that has a horizontal width gradually increased along a perimeter of the steam discharge module 310. The rotation guide member 316 having the structural feature may convert a linear-direction external fore delivered by the connection member 510 into a rotational force.

Referring to FIG. 10A, when the connection member 510 is moved in the x-axis direction and one end of the connection member 510 contacts the rotation guide member 316, the connection member 510 may apply an x-axis-direction external force to the rotation guide member 316.

The x-axis-direction external force may act from a wider-width portion of the rotation guide member 316 to a narrower-width portion of the rotation guide member 316. Accordingly, the rotation guide member 316, as illustrated in FIG. 10A, may rotate clockwise. The rotation of the rotation guide member 316 causes the steam discharge module 310 to horizontally swivel and to discharge steam outwards.

When a distance moved by the connection member 510 in a linear direction is longer than a reference distance, the button 221 is in a complete manipulation state. The internal lid 123 may be further provided with a manipulation limitation member that limits a distance moved by the connection member 510 to the reference distance until pressure in the internal pot 130 is reduced to pressure less than the predetermined pressure.

As described above, when the button 221 moves further in the y-axis direction, the connection member 510 may move further in the x-axis direction. In other words, a distance moved by the button 221 may be proportional to a distance moved by the connection member 510. Accordingly, when a distance moved in a linear direction by the connection member 510 is longer than the reference distance, the manipulation state of the button 221 may be a complete manipulation state.

In this case, the internal lid 123 may be provided with a manipulation limitation member that limits movements of the connection member 510 until pressure in the internal pot 130 is reduced to pressure less than the predetermined pressure. The manipulation limitation member that is disposed on a path of movements of the connection member 510 and that limits movements of the connection member 510 is described above. Below, a manipulation limitation member implemented as a pressure weight 610 is described.

Referring to FIG. 10B, the pressure weight 610 may be provided to pass through the internal lid 123, and, when pressure in the internal pot 130 is greater than the predetermined pressure, may ascend in an upper direction of the internal lid 123 and may limit linear-direction movements of the connection member 510.

When pressure in the internal pot 130 is greater than the predetermined pressure, the pressure weight 610 may ascend in the upper direction of the internal lid 123, and x-axis-direction movements of the connection member 510, as illustrated in FIG. 10B, may be limited by the ascended pressure weight 610.

Referring to FIG. 10C, when pressure in the internal pot 130 is reduced to pressure less than the predetermined pressure through continuous operations of discharging steam by the steam discharge module 310, the pressure weight 610 may descend, and the connection member 510 may move a distance longer than the reference distance in the x-axis direction. Thus, the rotation guide member 316 may be completely rotated clockwise, and the manipulation state of the button 221 may be converted into a complete manipulation state.

In this case, the lid handle 220 may horizontally swivel, and, accordingly, the lid 120 may be separated from the main body 110.

Figure 12:
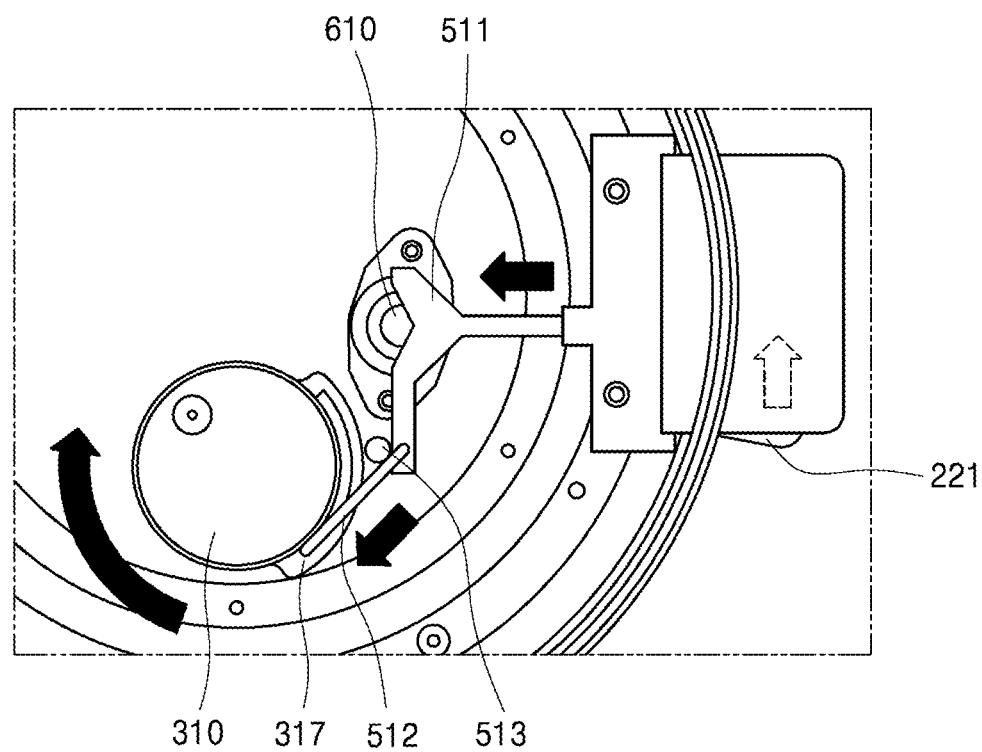
FIG. 12 is a view illustrating an example process in which the external force delivery part provides rotational force to the steam discharge module in FIG. 11.

FIGS. 11 and 12 illustrate another example structure of an external force delivery part and operation of the external force delivery part.

In some implementations, referring to FIG. 11, the external force delivery part may include a connection member 510 that is connected with the button 221 and that is moved in a linear direction by an external force delivered through the button 221, a link bar 512 that has one end connected to the connection member 510 and the other end connected to an outer surface of one side of the steam discharge module 310 and that converts a linear-direction external force delivered by the connection member 510 into a rotational force, and a direction guide jaw 513 that protrudes from the upper surface of the internal lid 123 to limit a rotation direction of the steam discharge module 310, caused by the rotational force delivered through the link bar 512.

In the case of a button 221 having a structure in which the button 221 is inserted in the inner direction (hereinafter referred to as "y-axis direction") of the lid handle 220, when a y-axis-direction external force is applied to the button 221, the connection member 510 may be moved in an inward direction (hereinafter referred to as "x-axis direction") of the lid 120. In this case, a distance moved by the connection member 510 may be increased based on magnitude of an external force applied to the button 221.

One end and the other end of the link bar 512 may be connected respectively with the connection member 510 and with an outer surface of one side of the steam discharge module 310. In other words, one end and the other end of the link bar 512 may be fixed to the outer surface of the steam discharge module 310 and to the connection member 510. Accordingly, an x-axis-direction external force applied to one end of the link bar 512 may act as a rotation force to the other end of the link bar 512 connected to a cylinder-shaped steam discharge module 310.

Referring to FIG. 12, an x-axis-direction external force delivered through the connection member 510 may act as a rotational force to the steam discharge module 310 through the link bar 512. The link bar 512 may deliver a rotational force to the steam discharge module 310 by contacting an outer surface of a direction guide jaw 513, and may limit a rotation direction of the steam discharge module 310.

For example, the direction guide jaw 513, as illustrated in FIG. 12, may protrude from the upper surface of the internal lid 123 to contact the link bar 512 in a +y-axis direction. Accordingly, the link bar 512 may deliver a clockwise rotational force to the steam discharge module 310 in a state in which the link bar 512 contacts the direction guide jaw 513.

When the direction guide jaw 513 protrudes from the upper surface of the internal lid 123 to contact the link bar 512 in a −y-axis direction, the link bar 512 may deliver a counterclockwise rotational force to the steam discharge module 310 in the state in which the link bar 512 contacts the direction guide jaw 513.

The steam discharge module 310 may be horizontally swiveled by the rotation force delivered through the link bar 512 and may discharge steam outwards.

A manipulation limitation member that limits movements of the connection member 510 may also be applied to the above-described implementations in FIG. 11. The process in which the connection member 510 is moved in relation to the applied manipulation limitation member is described above with reference to FIGS. 10A to 10C. Accordingly, detailed description in relation to this is omitted.

One end of the link bar 512, as illustrated in FIG. 12, may be inserted into a rotation guide groove 317 formed along the outer surface of the steam discharge module 310. Specifically, the rotation guide groove 317, horizontally formed within a certain range of central angles with respect to a central point of the steam discharge module 310, may be fixedly provided on the outer surface of the steam discharge module 310. In this case, one end of the link bar 512 may be inserted into the rotation guide groove 317 and may move along with the rotation guide groove 317.

In some implementations, where the link bar 512 is not manipulated, the steam discharge module 310 may horizontally swivel and may discharge steam based on a user manipulation to the upper surface of the steam discharge module 310.

FIGS. 13 and 14 illustrate another example structure of an external force delivery part and an example process in which the external force delivery part operates.

In some examples, referring to FIG. 13, the external force delivery part may include a connection member 510 that is connected with the button 221 and that is moved in a linear direction by an external force delivered through the button 221, a lever 514 that has a supporting point 514a fixed to the inside of the internal lid 123 and that has one end 514b swiveled with respect to the supporting point 514a by a linear-direction external force delivered by the connection member 510 and has the other end 514c swiveled in a direction opposite to the direction in which one end 514b is swiveled, and a wire 515 that has one end connected with the other end 514c of the lever 514 and has the other end connected to the outer surface of one side of the steam discharge module 310.

In the case of a button 221 having a structure in which the button 221 is inserted in the inner direction (hereinafter referred to as "y-axis direction") of the lid handle 220, when a y-axis-direction external force is applied to the button 221, the connection member 510 may be moved in an inward direction (hereinafter referred to as "x-axis direction") of the lid 120. In this case, a distance moved by the connection member 510 may be increased depending on magnitude of an external force applied to the button 221.

One end 514b of the lever 514 to which a linear-direction external force is supplied by the connection member 510 may rotate with respect to the supporting point 514a fixed to the internal lid 123 in one direction (e.g., a counterclockwise direction). Accordingly, the other end 514c of the lever 514 may also rotate with respect to the supporting point 514a.

The other end 514c of the lever 514 may be connected to the wire 515, and the wire 515 may be connected with a wire binder 318 provided on the outer surface of one side of the steam discharge module 310. As the other end 514c of the lever 514 swivels with respect to the supporting point 514a, the wire 515 may deliver a rotational force to the steam discharge module 310.

Referring to FIG. 14, an x-axis-direction external force delivered through the connection member 510 may act as a rotational force to the steam discharge module 310 through the lever 514 and the wire 515 connected to the lever 514. For example, as illustrated in FIG. 14, when the other end 514c of the lever 514, to which the wire 515 is connected, rotates counterclockwise, the wire 515 may deliver a clockwise rotational force to the steam discharge module 310.

A manipulation limitation member that limits movements of the connection member 510 may also be applied to the above-described implementation in FIG. 13. The process in which the connection member 510 is moved in relation to the applied manipulation limitation member is described above with reference to FIGS. 10A to 10C. Accordingly, detailed description in relation to this is omitted.

The present disclosure, as described above, may automatically discharge internal steam and may remove remaining pressures in the cooker when the lid is opened, thereby preventing damage to the electric pressure cooker, and an explosion and a fire of the electric pressure cooker, which may be caused by an instance release of the remaining pressures.

Additionally, the present disclosure may perform the operations of discharging steam and decoupling the main body and the lid at a time according to a user's single manipulation, thereby guaranteeing safety of a user without the user's consciousness of discharge of steam prior to the opening of the lid.

The above-described present disclosure may be replaced, modified and changed in various different forms by one having ordinary skill in the art within the technical spirit of the disclosure. Therefore, the disclosure is not limited to the above-described implementations and the attached drawings.

What is claimed is:

1. An electric pressure cooker comprising:
a main body that defines a body opening at an upper surface;
an internal pot configured to be accommodated in the main body through the body opening;
a lid coupling ring configured to rotate relative to the main body and be coupled to the upper surface of the main body;
an internal lid disposed in the lid coupling ring and configured to cover an upper surface of the internal pot, the internal lid defining a steam inlet;
a steam discharge module configured to horizontally swivel with respect to a central perpendicular line of the steam discharge module and discharge steam received through the steam inlet from an inside of the internal pot;
a lid handle configured to horizontally rotate the lid coupling ring relative to the main body, the lid handle comprising a button disposed at one side of the lid handle and configured to receive external force; and
an external force delivery part configured to receive the external force from the button and transmit the external force to swivel the steam discharge module,
wherein the button is configured to:
in a first manipulation state, allow rotation of the lid handle, and
in a second manipulation state, apply the external force to the external force delivery part to thereby swivel the steam discharge module.

2. The electric pressure cooker of claim 1, wherein the external force delivery part is connected to the button and comprises at least one of a lever, a link, a rod, or a wire.

3. The electric pressure cooker of claim 1, wherein the button is configured to:
in the first manipulation state, be positioned at a first position relative to the one side of the lid handle, the first position corresponding to a complete operation of the button; and
in the second manipulation state, be positioned at a second position relative to the one side of the lid handle, the second position corresponding to an incomplete operation of the button.

4. The electric pressure cooker of claim 1, further comprising:
an internal pot packing configured to be installed along a perimeter of the internal lid and configured to cover a space defined between the internal lid and the internal pot.

5. The electric pressure cooker of claim 1, wherein the main body comprises a main body coupling ring disposed at the upper surface of the main body, and
wherein the lid coupling ring is configured to rotate relative to the main body coupling ring to thereby couple to the main body coupling ring.

6. The electric pressure cooker of claim 5, wherein the main body coupling ring comprises a plurality of guide jaws, and
wherein the lid coupling ring comprises a plurality of stopping jaws that are configured to move circumferentially with respect to the plurality of guide jaws and engage with the plurality of guide jaws, respectively.

7. The electric pressure cooker of claim 1, wherein the steam discharge module is configured to block the steam inlet based on a swivel angle of the steam discharge module according to a pressure in the internal pot.

8. The electric pressure cooker of claim 1, wherein the steam discharge module is configured to be swiveled by rotational force supplied through the external force delivery part to thereby discharge the steam outwards.

9. The electric pressure cooker of claim 1, wherein the steam discharge module comprises:
a housing that is configured to swivel and defines a screw groove on an inner surface;
a spring guide that is disposed in the housing and that is configured to, based on swiveling of the housing, move up or move down in the housing, the spring guide comprising a screw thread coupled to the screw groove;
a spring that is disposed in the housing and that has one end fixed to the spring guide; and
a pressure pipe configured to block the steam inlet based on elasticity of the spring.

10. The electric pressure cooker of claim 9, wherein the pressure pipe is configured to:
based on the spring guide moving up in the housing, move away from the steam inlet to thereby open the steam inlet; and
based on the spring guide moving down in the housing, move to the steam inlet to thereby block the steam inlet.

11. The electric pressure cooker of claim 9, wherein the spring surrounds the pressure pipe.

12. The electric pressure cooker of claim 1, wherein the lid handle is configured to horizontally rotate and provide rotational force to the lid coupling ring based on a pressure in the internal pot becoming less than a predetermined pressure as the steam discharge module discharges steam.

13. The electric pressure cooker of claim 1, further comprising:
a manipulation limitation member configured to maintain the button in the second manipulation state based on a pressure in the internal pot being greater than a predetermined pressure.

14. The electric pressure cooker of claim 1, wherein the external force delivery part comprises a connection member that is connected to the button and that is configured to move in a linear direction based on the external force delivered through the button, and
wherein the steam discharge module comprises a spiral-shaped rotation guide member that is disposed on an outer surface of the steam discharge module and that is configured to convert linear force delivered by the connection member into rotational force.

15. The electric pressure cooker of claim 14, wherein the button is configured to move from a reference position to the first manipulation state to thereby move the connection member in the linear direction by a movement distance greater than a reference distance, and
  wherein the internal lid comprises a manipulation limitation member that is configured to limit the movement distance of the connection member to be less than the reference distance based on a pressure in the internal pot being greater than or equal to a predetermined pressure.

16. The electric pressure cooker of claim 15, wherein the manipulation limitation member passes through the internal lid, and
  wherein the manipulation limitation member comprises a pressure weight that is configured to move in an upper direction from the internal lid to thereby limit movement of the connection member in the linear direction based on the pressure in the internal pot being greater than or equal to the predetermined pressure.

17. The electric pressure cooker of claim 1, wherein the external force delivery part comprises:
  a connection member that is connected to the button and that is configured to move in a linear direction based on the external force delivered through the button;
  a link bar having a first end connected to the connection member and a second end connected to an outer surface of the steam discharge module, the link bar being configured to convert linear force delivered by the connection member into rotational force; and
  a direction guide jaw that protrudes from an upper surface of the internal lid and that is configured to limit rotation of the steam discharge module based on the steam discharge module being rotated by the rotational force delivered through the link bar.

18. The electric pressure cooker of claim 1, wherein the external force delivery part comprises:
  a connection member that is connected to the button and that is configured to move in a linear direction by the external force delivered through the button;
  a lever that has a supporting point fixed to the internal lid, the lever having (i) a first end configured to rotate in a first direction with respect to the supporting point by linear force delivered by the connection member and (ii) a second end configured to rotate in a second direction opposite to the first direction; and
  a wire that has a first end connected to the second end of the lever and a second end connected to an outer surface of the steam discharge module.

19. The electric pressure cooker of claim 1, further comprising:
  a noise reduction module that is disposed on an upper surface of the internal lid, that has a ring shape, and that surrounds the steam discharge module,
  wherein an inner circumferential surface of the noise reduction module is spaced apart from the steam discharge module.

20. The electric pressure cooker of claim 19, wherein the steam discharge module is configured to discharge the steam horizontally toward the inner circumferential surface of the noise reduction module.

* * * * *